US012179476B2

(12) United States Patent
Tomatsu

(10) Patent No.: US 12,179,476 B2
(45) Date of Patent: Dec. 31, 2024

(54) MEDIUM SUPPORTING DEVICE AND PRINTING APPARATUS

(71) Applicant: BROTHER KOGYO KABUSHIKI KAISHA, Nagoya (JP)

(72) Inventor: Yoshiya Tomatsu, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 664 days.

(21) Appl. No.: 17/520,178

(22) Filed: Nov. 5, 2021

(65) Prior Publication Data

US 2022/0169053 A1 Jun. 2, 2022

(30) Foreign Application Priority Data

Nov. 30, 2020 (JP) ................................ 2020-198323

(51) Int. Cl.
*B41J 15/04* (2006.01)
*B65H 16/06* (2006.01)

(52) U.S. Cl.
CPC ............ *B41J 15/042* (2013.01); *B65H 16/06* (2013.01)

(58) Field of Classification Search
CPC .................................................. B65H 75/2413
USPC .............................................. 242/578, 578.1
See application file for complete search history.

(56) References Cited

U.S. PATENT DOCUMENTS

| | | | | |
|---|---|---|---|---|
| 1,001,056 A * | 8/1911 | Lounsberry | B65H 75/08 242/545.1 |
| 1,152,895 A * | 9/1915 | Keck | B65H 16/06 242/608.5 |
| 4,378,095 A * | 3/1983 | Reynolds | B65H 16/06 242/599.3 |
| 7,125,182 B2 * | 10/2006 | Campbell | B41J 15/02 400/613 |
| 9,038,937 B2 * | 5/2015 | Riegner, III | B65H 75/2416 242/578.1 |
| 2017/0036884 A1 * | 2/2017 | Cox | B65H 49/324 |

FOREIGN PATENT DOCUMENTS

| | | |
|---|---|---|
| JP | 2018-118849 A | 8/2018 |
| JP | 2019-26426 A | 2/2019 |

* cited by examiner

*Primary Examiner* — William A. Rivera
(74) *Attorney, Agent, or Firm* — Merchant & Gould P.C.

(57) ABSTRACT

First and second flanges protrude from a shaft portion in a direction crossing an axial direction. The first and second flanges define a position of a roll fitted to the shaft portion in the axial direction. First and second facing surfaces face the roll. First and second contact portions protrude from the first and second facing surfaces in the axial direction. The first and second contact portions are configured to contact a paper tube. A screw member is rotatable relative to the shaft portion, the first flange, and the second flange, thereby changing a relative position of the first flange and the second flange between a hold position at which the first and second contact portions press and hold the paper tube in the axial direction and a separation position at which at least the first contact portion or the second contact portion is separated from the paper tube.

20 Claims, 10 Drawing Sheets

MEDIUM SUPPORTING DEVICE AND PRINTING APPARATUS

CROSS REFERENCE TO RELATED APPLICATIONS

This application claims priority from Japanese Patent Application No. 2020-198323 filed Nov. 30, 2020. The entire content of the priority application is incorporated herein by reference.

BACKGROUND

Conventionally, various medium supporting devices have been developed that supply a long print medium wound in a roll shape in a printing apparatus. A medium supporting device includes a knob, a screw shaft, a paper tube insertion shaft, and blades. The screw shaft is rotated according to the rotation of the knob by the user, and the blades protrude from slits provided at equal intervals on the outer circumference of the paper tube insertion shaft. The blades protruding from the slits to outside of the paper tube insertion shaft contact the inner circumference of the paper tube that forms the center shaft of a roll inserted through the paper tube insertion shaft, and fixes the paper tube.

SUMMARY

According to one aspect, this specification discloses a medium supporting device. The medium supporting device includes a shaft portion, a first flange, a second flange, and a screw member. The shaft portion extends in an axial direction. The shaft portion is inserted in a paper tube of a roll. A print medium is wound around the paper tube. The first flange protrudes from the shaft portion in a direction crossing the axial direction. The first flange defines a position of the roll fitted to the shaft portion in the axial direction. The first flange includes a first facing surface and a first contact portion. The first facing surface faces the roll and faces toward one end side in the axial direction. The first contact portion protrudes from the first facing surface toward the one end side in the axial direction. The first contact portion is configured to contact the paper tube. The second flange protrudes from the shaft portion in the direction crossing the axial direction. The second flange defines, in cooperation with the first flange, the position of the roll fitted to the shaft portion in the axial direction. The second flange includes a second facing surface and a second contact portion. The second facing surface faces the roll and faces toward an other end side in the axial direction. The second contact portion protrudes from the second facing surface toward the other end side in the axial direction. The second contact portion is configured to contact the paper tube. The screw member is rotatable about an axis extending in the axial direction. The screw member is inserted in the shaft portion. The screw member is rotatable relative to the shaft portion, the first flange, and the second flange, thereby changing a relative position of the first flange and the second flange between a hold position at which the first contact portion and the second contact portion press and hold the paper tube in the axial direction and a separation position at which at least the first contact portion or the second contact portion is separated from the paper tube.

In the above medium supporting device, the first contact portion and the second contact portion press and hold both ends of the paper tube. Thus, even if there is variation in the diameter of the paper tube, the paper tube is fixed stably.

According to another aspect, this specification discloses a printing apparatus. The printing apparatus includes a housing and a medium supporting device. The housing has an accommodating portion. The medium supporting device is accommodated in the accommodating portion. The medium supporting device includes a shaft portion, a first flange, a second flange, and a screw member. The shaft portion extends in an axial direction. The shaft portion is inserted in a paper tube of a roll. A print medium is wound around the paper tube. The first flange protrudes from the shaft portion in a direction crossing the axial direction. The first flange defines a position of the roll fitted to the shaft portion in the axial direction. The first flange includes a first facing surface and a first contact portion. The first facing surface faces the roll and faces toward one end side in the axial direction. The first contact portion protrudes from the first facing surface toward the one end side in the axial direction. The first contact portion is configured to contact the paper tube. The second flange protrudes from the shaft portion in the direction crossing the axial direction. The second flange defines, in cooperation with the first flange, the position of the roll fitted to the shaft portion in the axial direction. The second flange includes a second facing surface and a second contact portion. The second facing surface faces the roll and faces toward an other end side in the axial direction. The second contact portion protrudes from the second facing surface toward the other end side in the axial direction. The second contact portion is configured to contact the paper tube. The screw member is rotatable about an axis extending in the axial direction. The screw member is inserted in the shaft portion. The screw member is rotatable relative to the shaft portion, the first flange, and the second flange, thereby changing a relative position of the first flange and the second flange between a hold position at which the first contact portion and the second contact portion press and hold the paper tube in the axial direction and a separation position at which at least the first contact portion or the second contact portion is separated from the paper tube.

In the above printing apparatus, the first contact portion and the second contact portion press and hold both ends of the paper tube. Thus, even if there is variation in the diameter of the paper tube, the paper tube is fixed stably and a print medium is conveyed stably.

BRIEF DESCRIPTION OF THE DRAWINGS

Embodiments in accordance with this disclosure will be described in detail with reference to the following figures wherein.

DETAILED DESCRIPTION

In the above-described medium supporting device, the paper tube may not be fixed stably due to the variation in the diameter of the paper tube.

In view of the foregoing, an aspect of an objective of this disclosure is to provide a medium supporting device and a printing apparatus in which a paper tube is fixed stably even if there is variation in the diameter of the paper tube.

Figure 1:
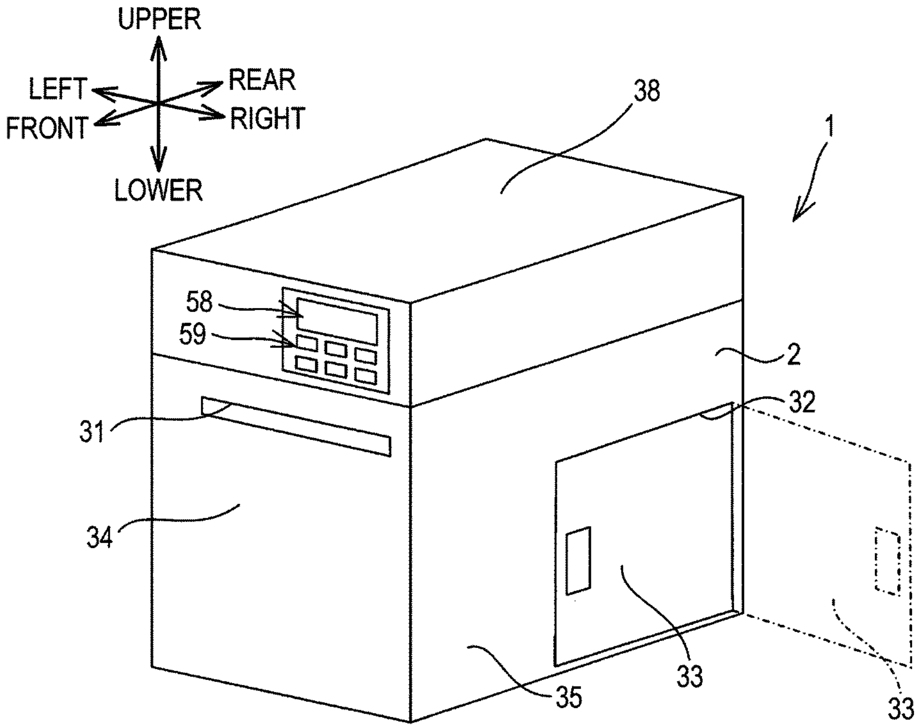
FIG. 1 is a perspective view of a printing apparatus 1.

A printing apparatus 1 and a medium supporting device 5 according to an embodiment will be described with reference to the drawings. The drawings to be referred to are used to explain the technical features that may be adopted by the present disclosure, and the configurations of the devices described are not intended to be limited thereto, but are merely explanatory examples. In the description of this embodiment, the lower left side, the upper right side, the lower right side, the upper left side, the upper side, and the lower side of FIG. 1 are defined as the front side, the rear side, the right side, the left side, the upper side, and the lower side of the printing apparatus 1 and the medium supporting device 5, respectively.

Figure 2:
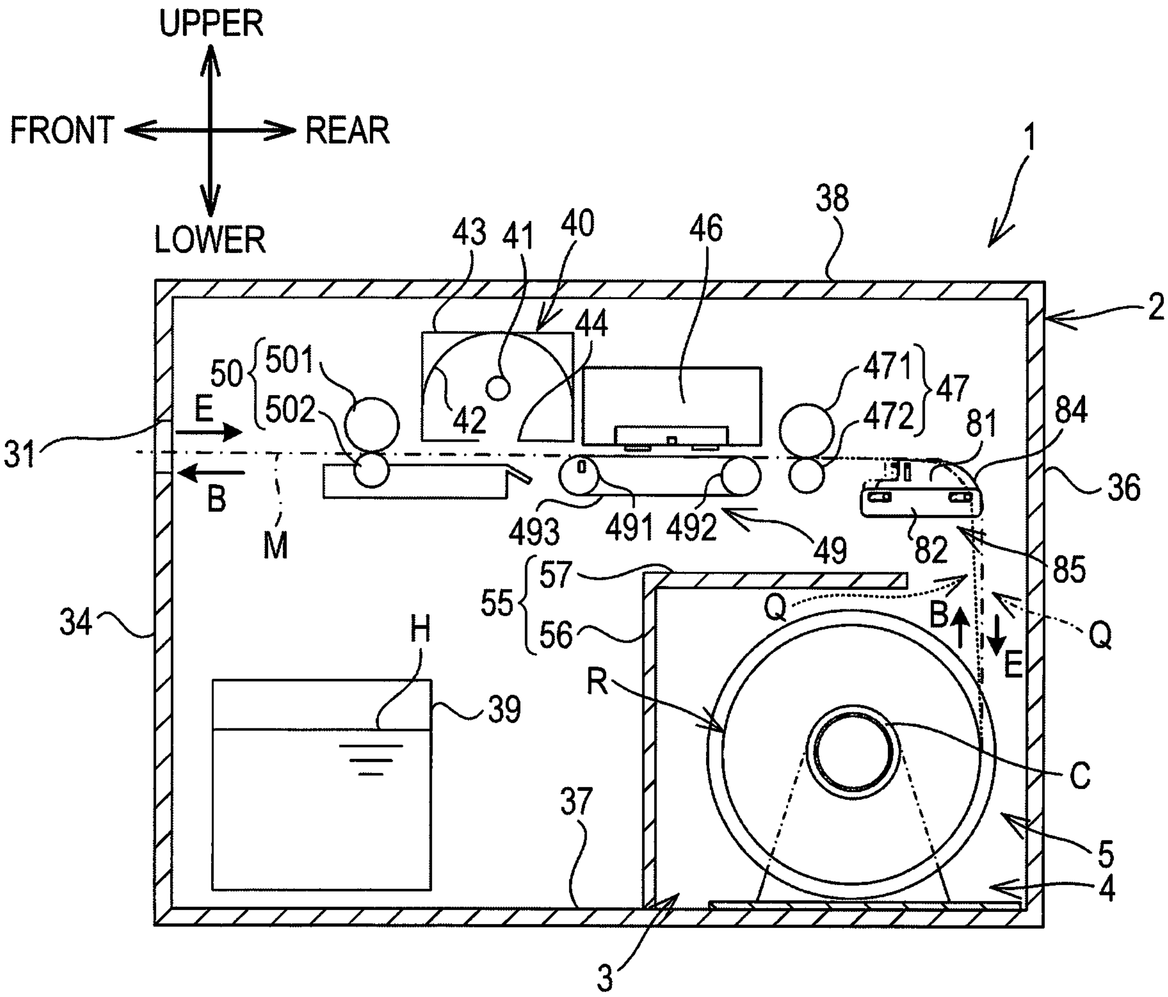
FIG. 2 is a cross-sectional view showing the internal configuration of the printing apparatus 1.

The configurations of the printing apparatus 1 and the medium supporting device 5 will be described with reference to FIGS. 1 to 9B. As shown in FIGS. 1 and 2, the printing apparatus 1 is an inkjet printer that prints on a long print medium M. The print medium M is, for example, a long sheet of paper wound in a roll shape on a tubular paper tube C (see FIG. 4). The printing apparatus 1 includes a housing 2, a display 58, and an operation interface 59.

The housing 2 has a front wall 34, a right wall 35, a rear wall 36, a left wall (not shown), a lower wall 37, an upper wall 38, and a cover 33, and has a rectangular parallelepiped shape having a size that can be placed on a table. The housing 2 is formed with a discharge port 31 and an opening 32. The discharge port 31 is formed on the front wall 34 of the housing 2 in a long rectangular shape in the left-right direction when viewed from the front. The opening 32 is formed in the lower rear portion of the right wall 35 of the housing 2 in a rectangular shape when viewed from the right side. The cover 33 is a rectangular plate when viewed from the right side, and is supported at the lower rear part of the right side surface of the housing 2 so as to be rotationally movable between a closed position that closes the opening 32 (shown by the solid line in FIG. 1) and an open position that opens the opening 32 (shown by the single-dot chain line in FIG. 1). The display 58 is provided at the upper right portion of the front surface of the front wall 34 of the housing 2, and displays an image. The operation interface 59 is provided below the display 58 in the upper right portion of the front surface of the front wall 34 of the housing 2, and includes a plurality of buttons for inputting various instructions. The display 58 and the operation interface 59 are provided above the discharge port 31.

As shown in FIG. 2, the printing apparatus 1 has, inside the housing 2, a partition wall 55, an accommodating portion 3, a magazine 4, the medium supporting device 5, a drive mechanism 110, a print head 46, a first conveyor 47, and a first conveyance drive part (not shown), a back tension applying device 85, a fixing unit 40, a second conveyor 49, a second conveyance drive part (not shown), a third conveyor 50, and a third conveyance drive part (not shown). The partition wall 55 has a first wall portion 56 extending upward from the lower wall 37 of the housing 2 and a second wall portion 57 extending rearward from the upper end of the first wall portion 56, and partitions the internal space of the housing 2. The second wall portion 57 is separated from the rear wall 36 of the housing 2 in the front-rear direction. The accommodating portion 3 is a space surrounded by the partition wall 55 and the housing 2 and located at the left side of the cover 33 at the closed position and at the rear lower part of the printing apparatus 1. The accommodating portion 3 accommodates the medium supporting device 5 in a state where an end of a screw member 10 (described later) at an other end side D2 in an axial direction is supported. The medium supporting device 5 of the present embodiment is accommodated in the accommodating portion 3 in a state where both ends of the axial direction D described later are supported by the magazine 4 and the drive mechanism 110.

Figure 3:
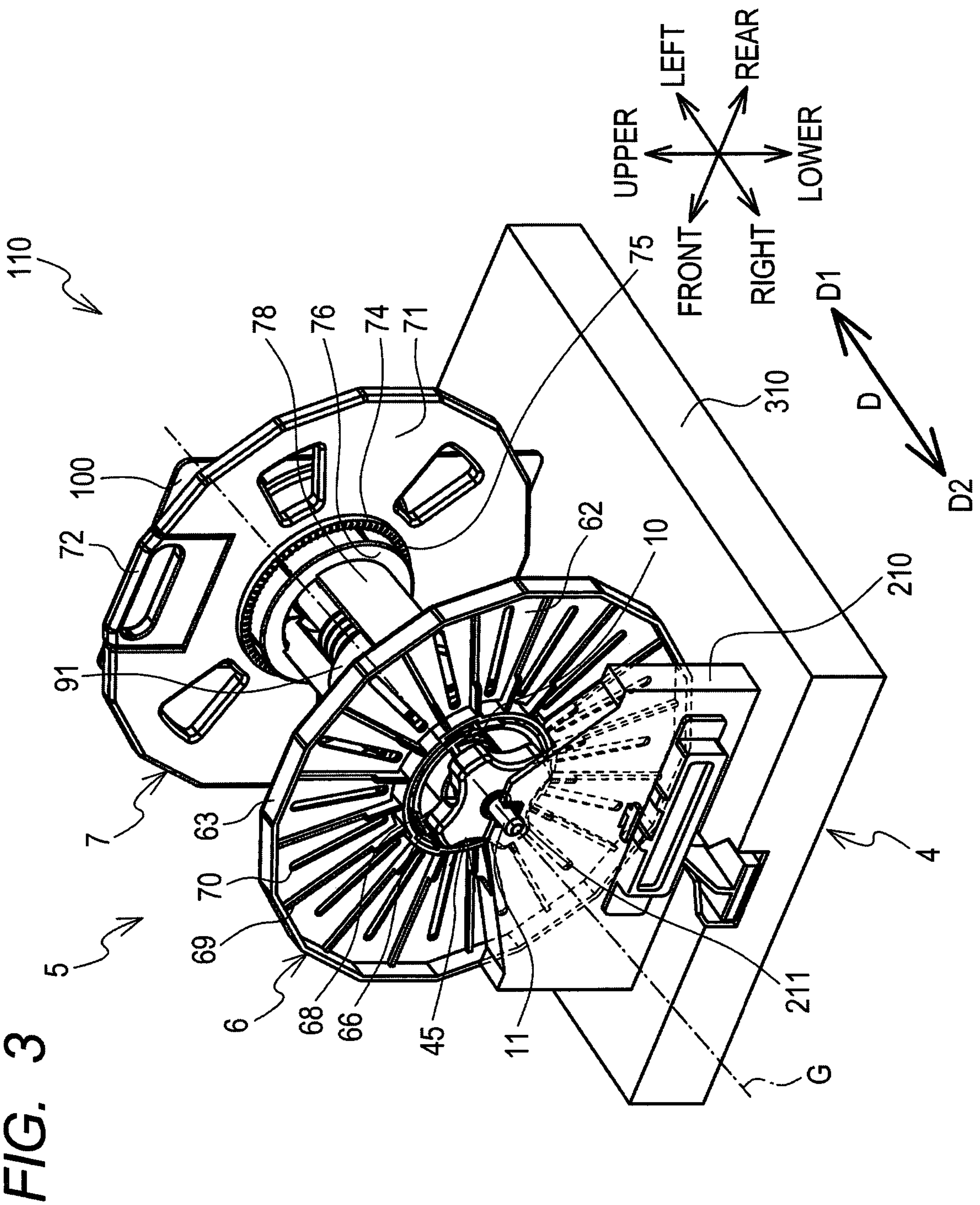
FIG. 3 is a perspective view of a medium supporting device 5 supported by a magazine 4.
Figure 4:
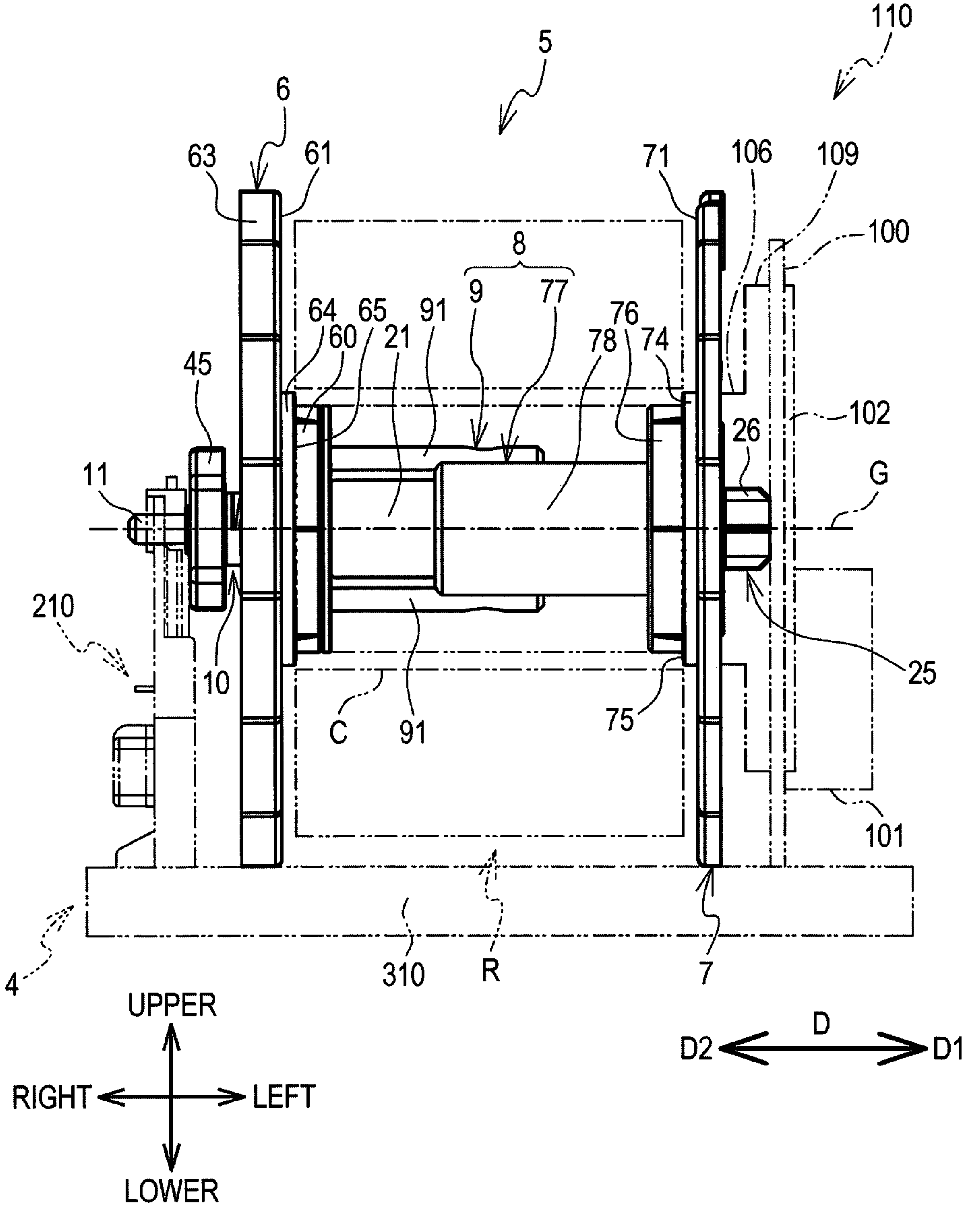
FIG. 4 is a rear view of the medium supporting device 5 supported by the magazine 4.

As shown in FIGS. 3 and 4, the magazine 4 is a support stand in the shape of the letter L when viewed from the rear, and supports the right end of the medium supporting device 5 such that a shaft portion 8 (described later) is rotatable about an axis G extending in the left-right direction. The right end of the medium supporting device 5 is detachable supported on the magazine 4. The magazine 4 is accommodated in the accommodating portion 3 of the printing apparatus 1 so as to be removed from the housing 2. When a user replaces a roll R, the user arranges the cover 33 at the open position, removes the magazine 4 from the interior of the housing 2, thereby performing a replacement operation of the roll R. The magazine 4 includes a stand portion 310 and a right wall portion 210. The stand portion 310 is in the shape of a plate extending in a horizontal direction. The right wall portion 210 is in the shape of a plate extending upward from the right portion of the upper surface of the stand portion 310. In the upper end of the right wall portion 210, a support portion 211 which is recessed downward is formed. The right wall portion 210 and a left wall portion 100 are detachably attached to the stand portion 310.

Figure 5A:
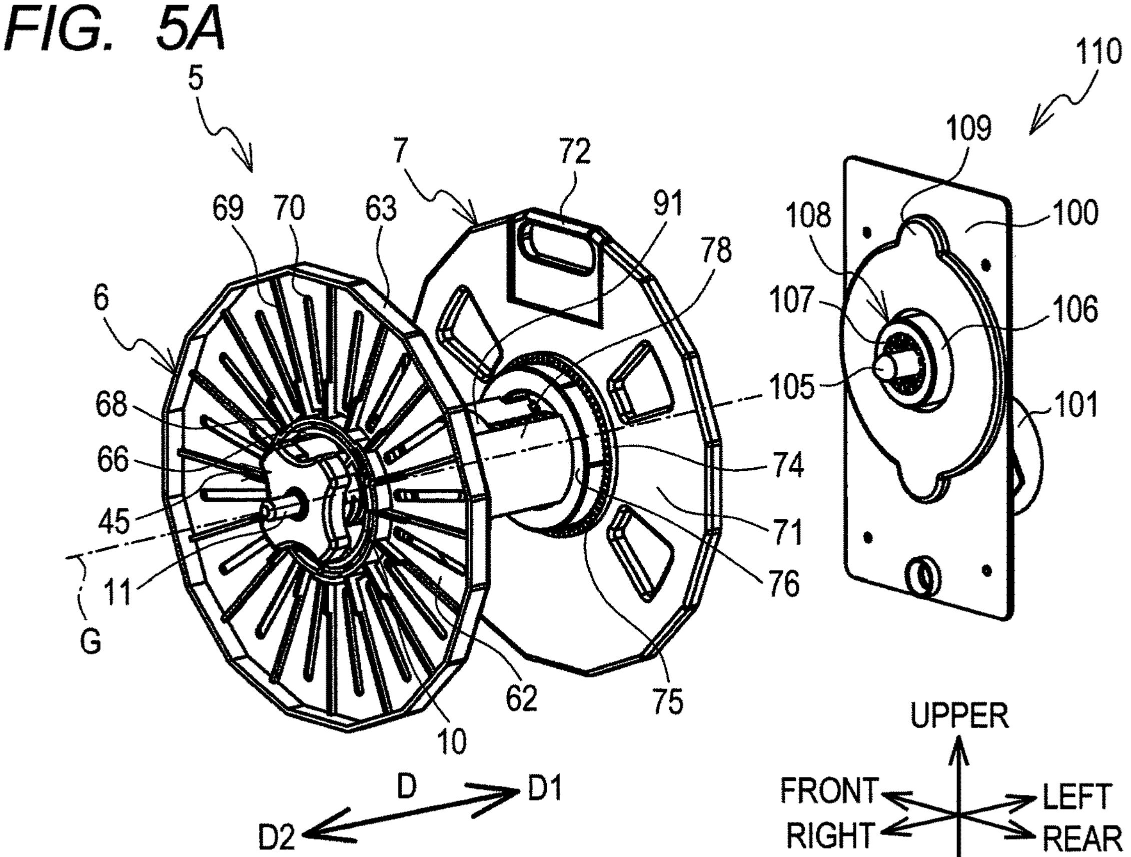
FIG. 5A is a perspective view of the medium supporting device 5 before an engaging portion 25 of a stopper 20 and an engaged portion 108 are engaged with each other.
Figure 5B:
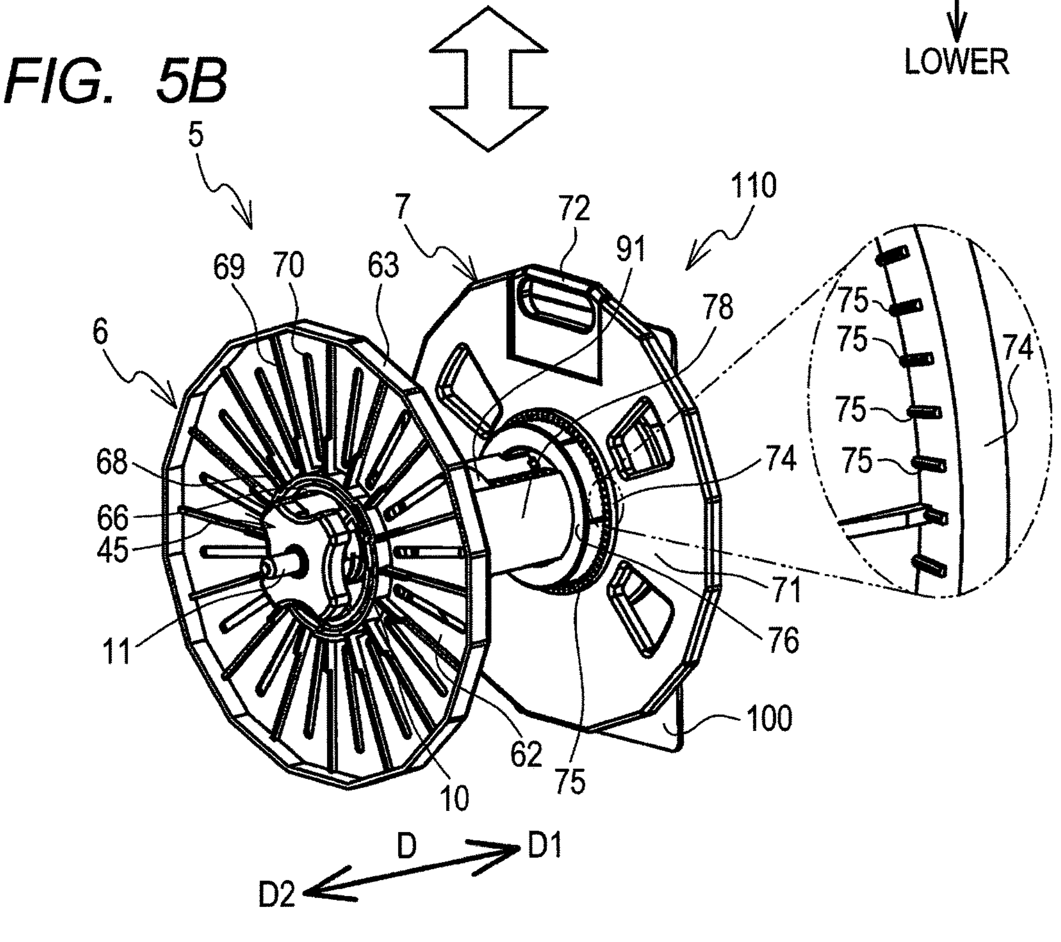
FIG. 5B is a perspective view of the medium supporting device 5 in a state where the engaging portion 25 of the stopper 20 and the engaged portion 108 are engaged with each other.
Figure 6:
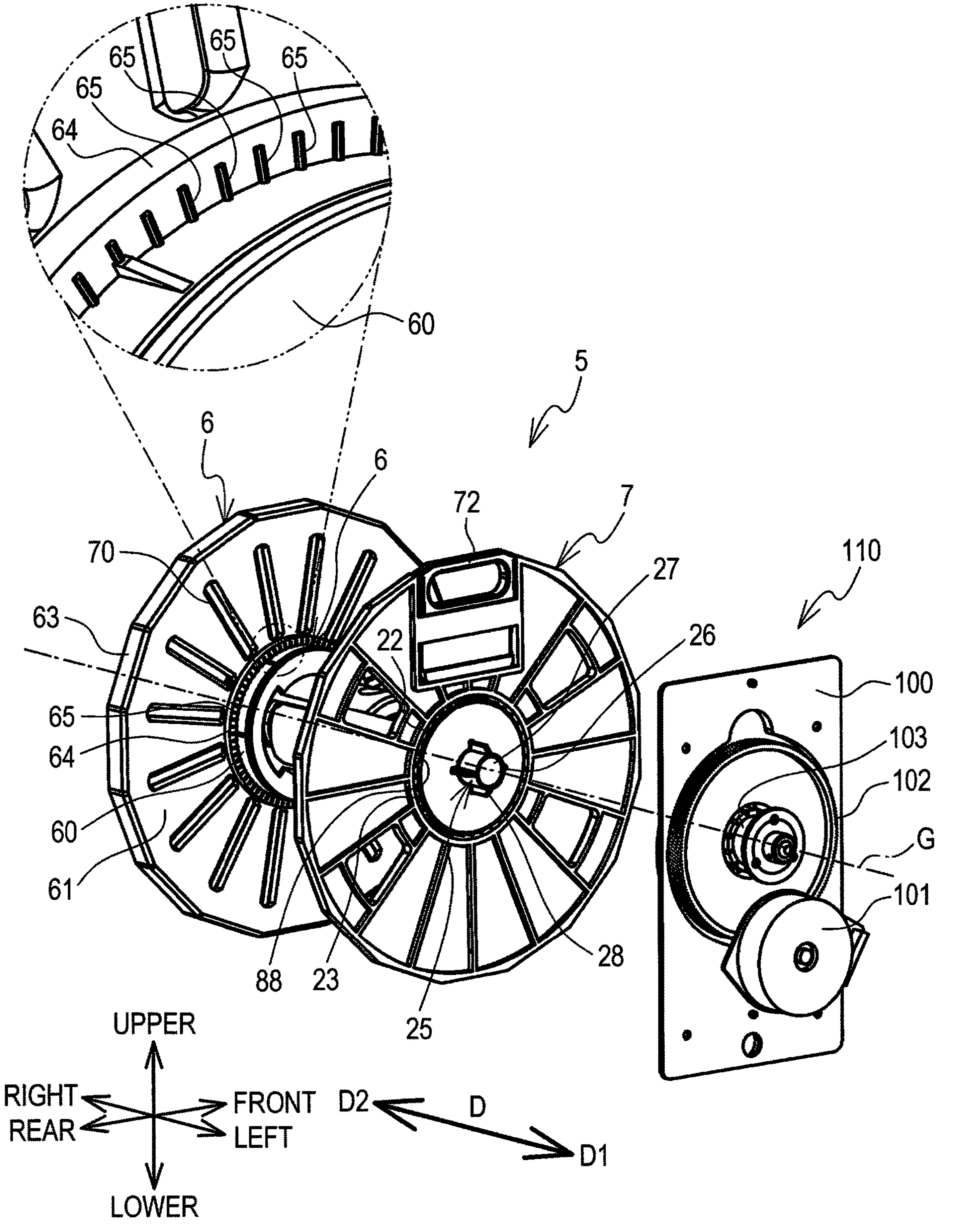
FIG. 6 is a perspective view of the medium supporting device 5 before the engaging portion 25 of the stopper 20 and the engaged portion 108 are engaged with each other.

As shown in FIGS. 5A and 5B, the left end of the medium supporting device 5 is detachable from the drive mechanism 110. The drive mechanism 110 includes the left wall portion 100, a protruding portion 109, an engaged portion 108, a shaft portion 103, a gear 102 and a drive part 101. The left wall portion 100 is in the shape of a plate extending substantially perpendicularly to the stand portion 310 above the left portion of the upper surface of the stand portion 310 in a state where the magazine 4 is accommodated in the accommodating portion 3. The protruding portion 109 is a part which protrudes rightward from the right surface of the left wall portion 100. The engaged portion 108 detachably engages with an engaging portion 25 of a stopper 20 described later. The engaged portion 108 includes a tube portion 106, protruding portions 107 and a shaft portion 105. The tube portion 106 is a tubular part which penetrates the left wall portion 100. The protruding portions 107 are provided on the inner circumference of the tube portion 106 and protrude toward the axis G. As shown in FIG. 6, the shaft portion 103 and the gear 102 are provided on the left surface of the left wall portion 100. The shaft portion 103 extends along the axis G. The gear 102 is rotatable about the shaft portion 103, and meshes with a gear (not shown) provided at the output shaft (not shown) of the drive part 101. The shaft portion 103 is connected to the tube portion 106. The drive part 101 is provided at the left side of the left wall portion 100. As the drive part 101 is driven, the shaft portion 103 and the tube portion 106 rotate about the axis G. The drive part 101 is, for example, a stepping motor which is rotatable forward and backward.

As shown in FIG. 2, the print head 46 prints an image on the print medium M fed out from the accommodating portion 3. The print head 46 of the present embodiment is an inkjet head which includes a plurality of nozzles (not shown) for ejecting liquid H in an ejection direction and which ejects the liquid H (for example, a black ink) from the plurality of the nozzles to print the image on the print medium M. The ejection direction in the present embodiment is downward, and the print head 46 is provided above a conveyance path Q of the print medium M with the plurality of the nozzles facing downward. The conveyance path Q is a path through which the print medium M is conveyed in which the print medium M is fed out from the accommodating portion 3 and discharged from the discharge port 31 to the outside of the housing 2. The liquid H is supplied through a tube (not shown) from a tank 39 arranged within the housing 2 to the print head 46.

The first conveyor 47 conveys the print medium M in a conveyance direction B from the accommodating portion 3 toward the print head 46 and in a return direction E opposite the conveyance direction B. The conveyance direction B is a direction along the conveyance path Q from the accommodating portion 3 toward the print head 46. The conveyance direction B changes according to the position on the conveyance path Q. The conveyance direction B from the accommodating portion 3 to the back tension applying device 85 changes according to the remaining amount of print medium M. When the remaining amount of print medium M is an initial value, the conveyance direction B is substantially upward. The conveyance direction B from the back tension applying device 85 to the discharge port 31 is substantially forward. In other words, in the printing apparatus 1, in a part where the print medium M contacts the back tension applying device 85, the conveyance path Q is bent and thus the conveyance direction B is changed.

The first conveyor 47 is provided upstream of the print head 46 in the conveyance direction and downstream of the accommodating portion 3 in the conveyance direction. The first conveyor 47 of the present embodiment includes a conveyance roller 471 which is rotatable about an axis extending in the left-right direction and a pinch roller 472, and the conveyance roller 471 and the pinch roller 472 pinch the print medium M vertically and perform nip conveyance. The first conveyance drive part drives the first conveyor 47 to rotate. The first conveyance drive part is, for example, a stepping motor which is rotated forward and backward.

In the conveyance path Q, the back tension applying device 85 applies a back tension to the print medium M between the accommodating portion 3 and the first conveyor 47. The back tension is a tension which acts in a direction opposite the direction of travel of the print medium M. The back tension applying device 85 is arranged upstream of the first conveyor 47 in the conveyance direction and downstream of the medium supporting device 5 in the conveyance direction, and contacts the print medium M to urge the print medium M in a direction crossing the conveyance direction B. The back tension applying device 85 is provided at the rear of the first conveyor 47 and above the accommodating portion 3. The back tension applying device 85 includes a contact member 81, a support member 82 and an urging member (not shown). The contact member 81 includes a contact surface 84 that contacts the print medium M. The support member 82 supports the contact member 81 such that the contact member 81 is movable in a direction crossing the conveyance direction. The urging member is, for example, a coil spring, and urges the contact member 81 in a direction crossing the conveyance direction B.

The medium supporting device 5 supports the roll R such that the roll R is rotatable about the axis G extending in the left-right direction (axial direction D). As shown in FIGS. 3 to 7, the medium supporting device 5 includes the shaft portion 8, a first flange 6, a second flange 7, a screw member 10, the stopper 20 and a knob 45. In the following description, the rotation center of the shaft portion 8 is also referred to as the axis G, and the direction around the axis G is referred to as a circumferential direction. A direction in which the axis G extends is referred to as the axial direction D, and a direction perpendicular to and away from the axis G is referred to as a radial direction. In the present embodiment, the axial direction D is the left-right direction, one end side D1 in the axial direction (hereinafter simply referred to as "the one end side D1") is the left side, and the other end side D2 in the axial direction (hereinafter simply referred to as "the other end side D2") is the right side.

Figure 7:
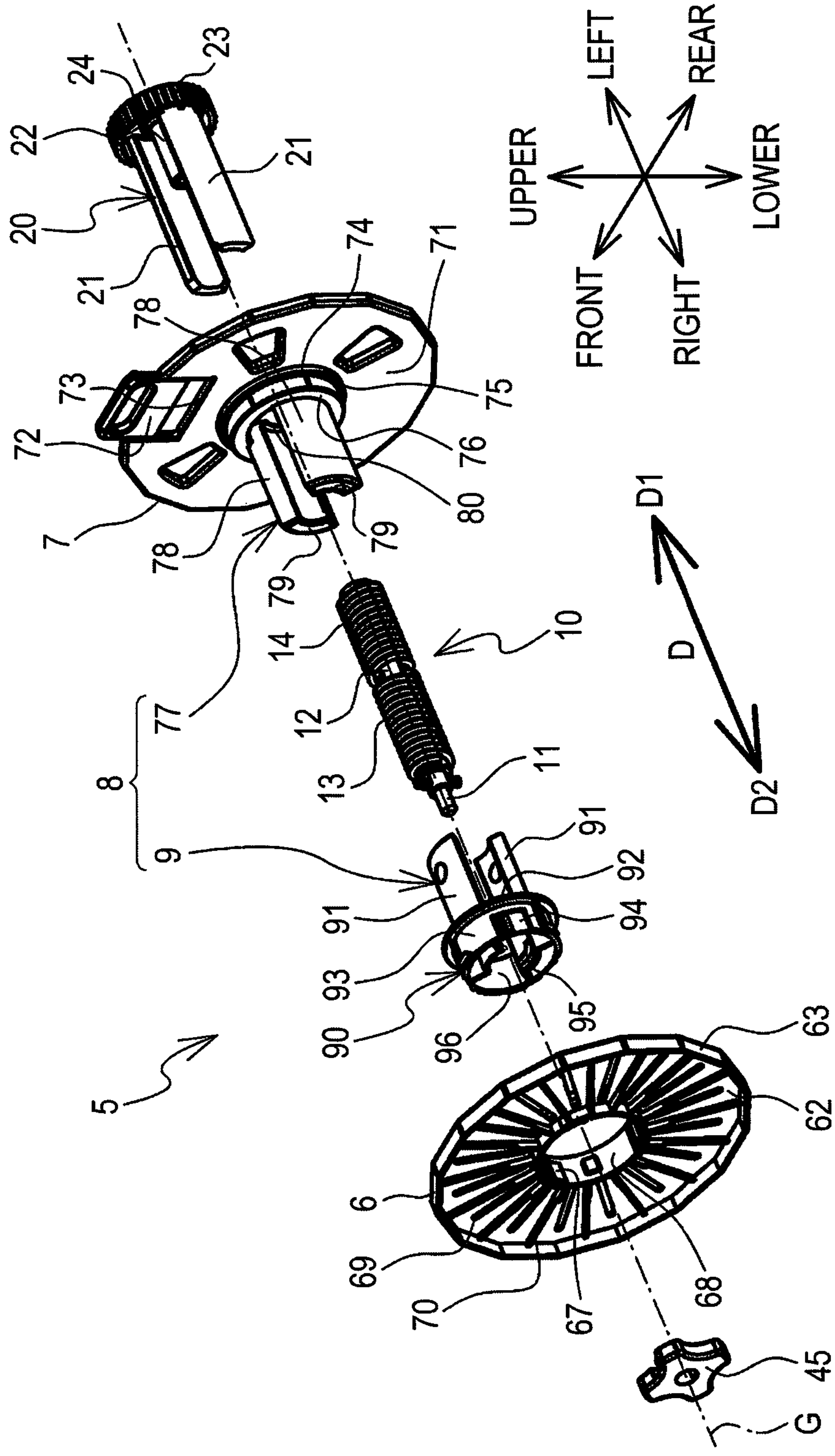
FIG. 7 is an exploded perspective view of the medium supporting device 5.

The shaft portion 8 is inserted through the paper tube C of the roll R extending in the axial direction D. The elongated print medium M is wound around the paper tube C. As shown in FIG. 4, the diameter of the shaft portion 8 is smaller than the diameter of the insertion hole of the paper tube C. The shaft portion 8 of the present embodiment includes a first sleeve 9 and a second sleeve 77. As shown in FIG. 7, the first sleeve 9 includes a cylindrical portion 90 and a pair of first protruding portions 91. The cylindrical portion 90 is a tubular part which is provided at the right end of the first sleeve 9. The cylindrical portion 90 includes an outer circumferential surface 93, a flange portion 92, a plurality of engaging portions 94, an inner circumferential surface 96 and a first engaging protrusion 95. The flange portion 92 protrudes radially from the outer circumferential surface 93, and is provided at the left end of the cylindrical portion 90. The engaging portions 94 are parts which protrude radially from the outer circumferential surface 93 of the cylindrical portion 90. The plurality of engaging portions 94 are arranged on the outer circumferential surface 93 of the cylindrical portion 90 at substantially regular intervals in the circumferential direction. The first engaging protrusion 95 is provided at the inner circumferential surface 96 of the cylindrical portion 90, and protrudes toward the axis G, and engages with a thread 13 of the screw member 10 described later. The first engaging protrusion 95 of the present embodiment is a female screw which is screwed to the thread 13. The first engaging protrusion 95 is provided several leads at the right end of the inner circumferential surface 96 of the cylindrical portion 90. The first engaging protrusion 95 is provided, with respect to the circumferential direction, at a part where the pair of first protruding portions 91 are provided. In other words, the first engaging protrusion 95 is provided at a part of the circumferential direction.

The pair of first protruding portions 91 protrude farther leftward than the flange portion 92, and are curved in a fan shape along an arc about the axis G when viewed from the left side. The pair of first protruding portions 91 are provided symmetrically with respect to the point that is the axis G when viewed from the left side. The diameter of the pair of first protruding portions 91 is smaller than that of the cylindrical portion 90, and the right ends of the pair of first protruding portions 91 extend up to the right end of the cylindrical portion 90. The pair of first protruding portions 91 protrude farther leftward than a first contact portion 64 and a step portion 60 described later. The cylindrical portion 90 of the first sleeve 9 is detachably fitted to the first flange 6 described later. In a state where the first sleeve 9 is fitted to the first flange 6, the first sleeve 9 is movable, together with the first flange 6, in the axial direction D relative to the screw member 10.

The second sleeve 77 includes a pair of second protruding portions 78 and a second engaging protrusion 80. The pair of second protruding portions 78 protrude farther toward the other end side D2 than a second contact portion 74 and a step portion 76 described later. The pair of second protruding portions 78 are curved in a fan shape along an arc about the axis G when viewed from the right side. The pair of second protruding portions 78 are provided symmetrically with respect to the point that is the axis G when viewed from the right side. The second sleeve 77 of the present embodiment is formed integrally with the second flange 7 described later, and is movable, together with the second flange 7, in the axial direction D relative to the screw member 10. In the axial direction D, the left ends of the pair of second protruding portions 78 extend up to the left end of the second flange 7. In the pair of second protruding portions 78, holes 79 are formed to penetrate in the left-right direction. The pair of second protruding portions 78 are hollow. A pair of protruding portions 21 of the stopper 20 described later are inserted from the left side through the pair of holes 79 respectively. The second engaging protrusion 80 is provided at the left ends of the inner surfaces of the pair of second protruding portions 78. The second engaging protrusion 80 protrudes toward the axis G, and engages with the thread 14 of the screw member 10 described later. The second engaging protrusion 80 of the present embodiment is a female screw which is screwed to the thread 14. The second engaging protrusion 80 is provided several leads at the left ends of the inner surfaces of the pair of second protruding portions 78. The second engaging protrusion 80 is provided, with respect to the circumferential direction, at a part where the pair of second protruding portions 78 are provided. In other words, the second engaging protrusion 80 is provided at a part of the circumferential direction.

The first sleeve 9 engages with the second sleeve 77 so as to be movable relative to the second sleeve 77 in the axial direction D. Specifically, as shown in FIG. 4, in the circumferential direction, the pair of second protruding portions 78 are arranged between the pair of first protruding portions 91 of the first sleeve 9, and the pair of first protruding portions 91 engage the pair of second protruding portions 78 so as to be movable in the left-right direction.

Figure 8A:
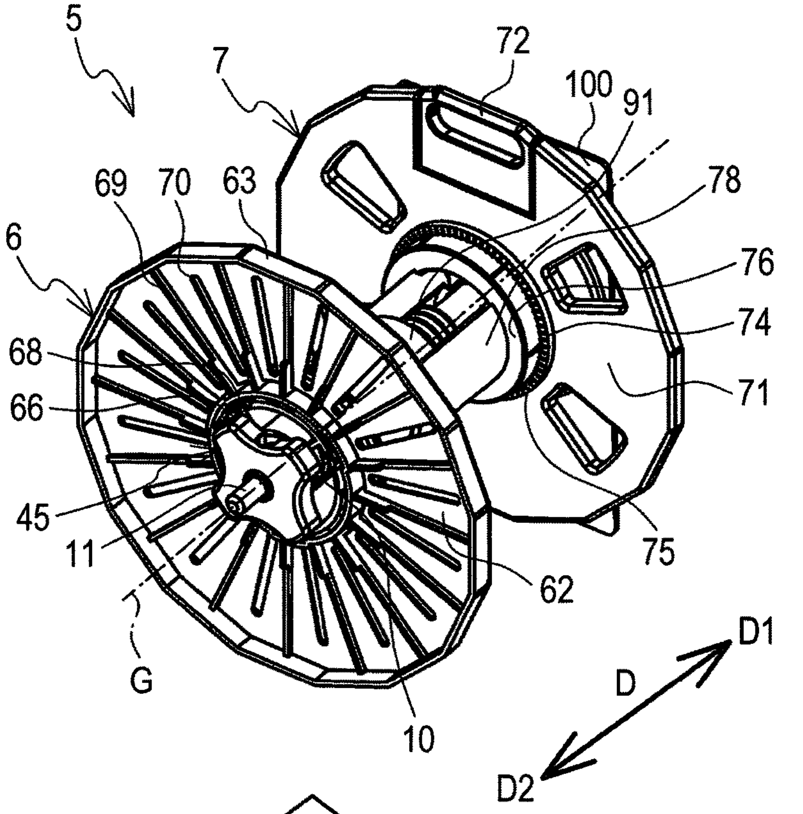
FIG. 8A is a perspective view of the medium supporting device 5 in a state where a distance between a first flange 6 and a second flange 7 in an axial direction D is the greatest.
Figure 8B:
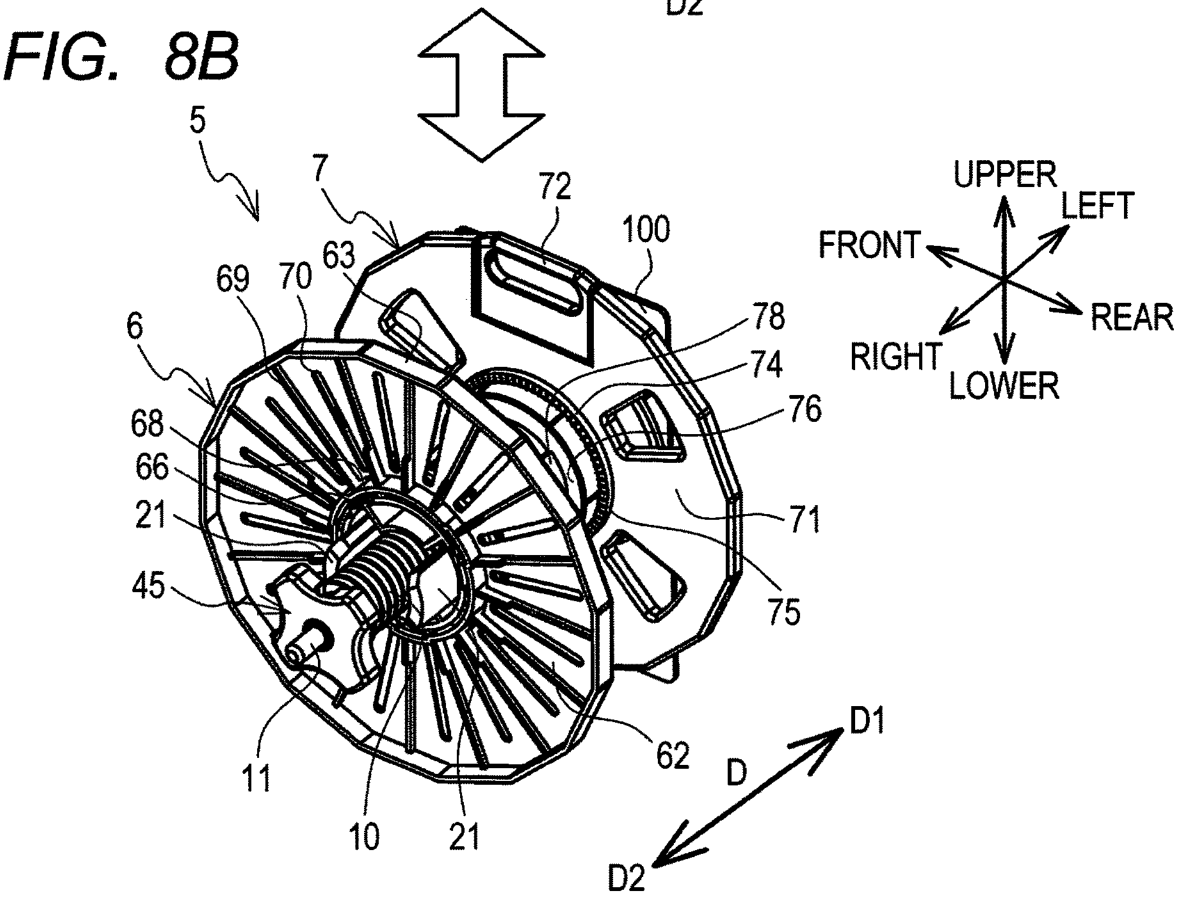
FIG. 8B is a perspective view of the medium supporting device 5 in a state where the distance between the first flange 6 and the second flange 7 in the axial direction D is the shortest.
Figure 9A:
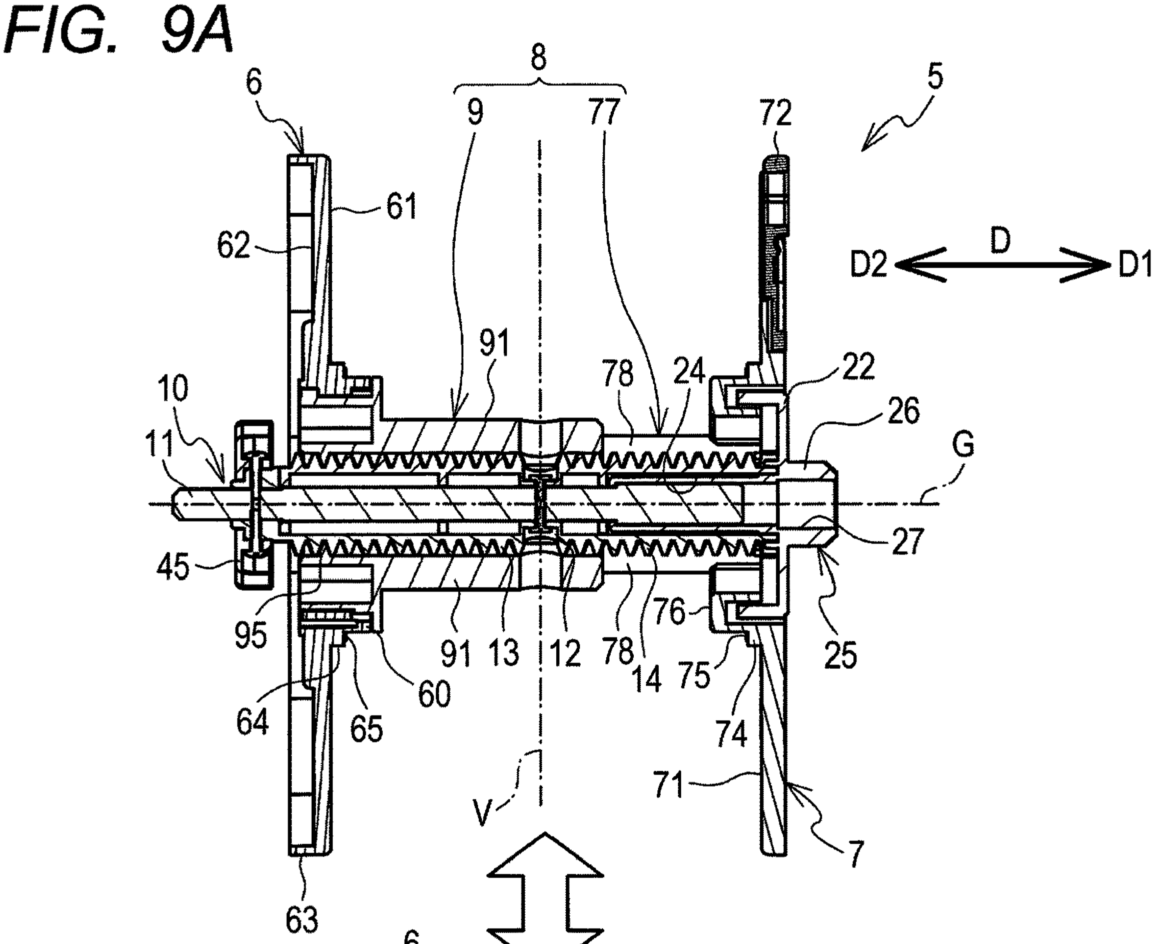
FIG. 9A is a cross-sectional view of the medium supporting device 5 in a state where the distance between the first flange 6 and the second flange 7 in the axial direction D is the greatest.
Figure 9B:
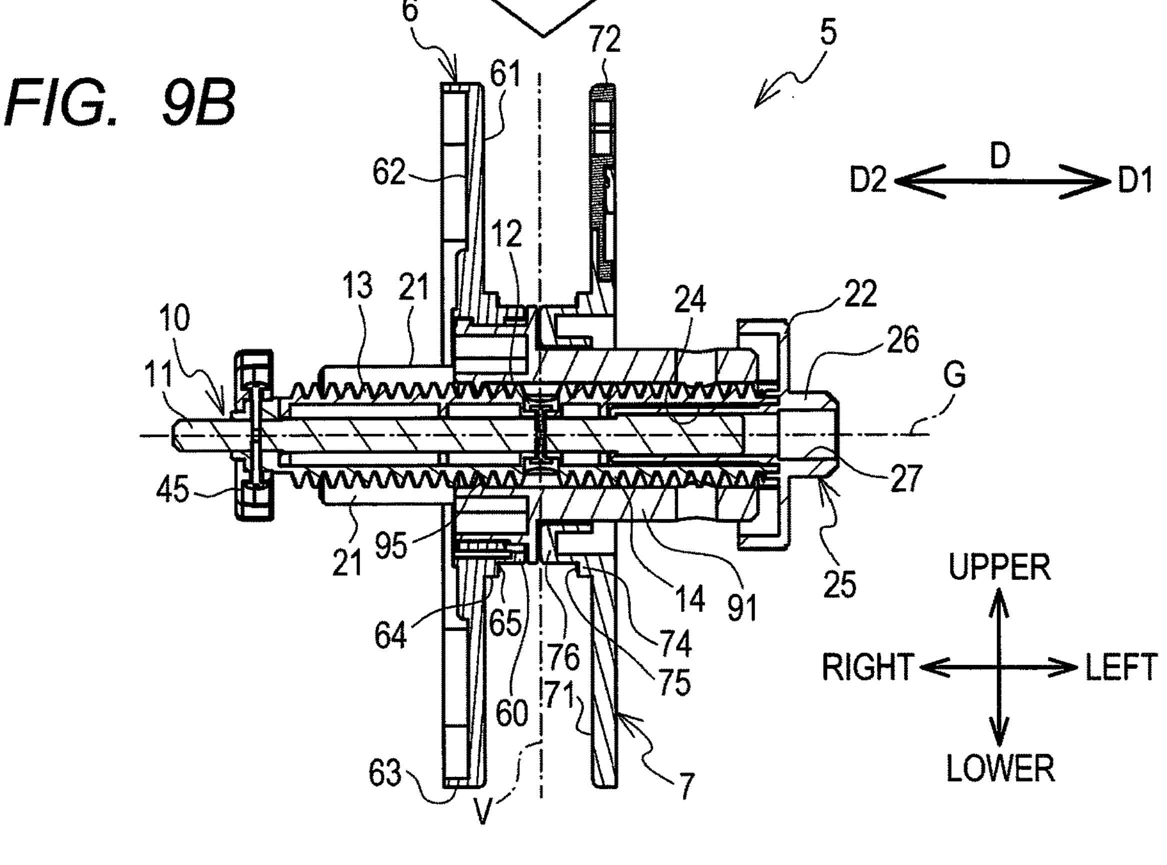
FIG. 9B is a cross-sectional view of the medium supporting device 5 in a state where the distance between the first flange 6 and the second flange 7 in the axial direction D is the shortest.

In a state where the distance between the first flange 6 and the second flange 7 in the axial direction D is the greatest as shown in FIGS. 8A and 9A, in the axial direction D, the left ends of the pair of first protruding portions 91 contact the right ends of the pair of second protruding portions 78 in the circumferential direction. In a state where the distance between the first flange 6 and the second flange 7 in the axial direction D is the shortest as shown in FIGS. 8B and 9B, the left ends of the pair of first protruding portions 91 are located at the left side of the second flange 7. The right ends of the pair of second protruding portions 78 are located at the right side of the first flange 6. In a part between the first flange 6 and the second flange 7 in the axial direction D, the pair of first protruding portions 91 contact the pair of second protruding portions 78 in the circumferential direction.

As shown in FIGS. 3 to 9A, 9B, the first flange 6 protrudes from the shaft portion 8 in a direction crossing the axial direction D so as to define the position of the roll R in the axial direction D which is inserted through the shaft portion 8. The first flange 6 is in the shape of a plate having a regular polygonal shape (regular hexadecagon) when viewed from the right side. The diameter of the first flange 6 is greater than that of the roll R. The first flange 6 includes a first facing surface 61, a concave portion 62, an outer circumferential wall portion 63, an inner circumferential wall portion 68, a plurality of ribs 69, the step portion 60 and the first contact portion 64. The first facing surface 61 is one of the surfaces of the first flange 6 at the one end side D1, and faces the roll R and the second flange 7. The first facing surface 61 extends substantially perpendicularly to the axis G. The concave portion 62 is recessed toward the one end side D1 at the opposite side of the first facing surface 61 of the first flange 6. The outer circumferential wall portion 63 is provided on the outer circumference of the first flange 6 and extends from the first facing surface 61 to the other end side D2.

As shown in FIG. 7, the inner circumferential wall portion 68 is provided on the inner circumference of the first flange 6 and extends from the first facing surface 61 to the other end side D2. The right end of the outer circumferential wall portion 63 and the right end of the inner circumferential wall portion 68 are located at the right side of the left end of the concave portion 62. An inner circumferential wall 66 includes a plurality of engaged portions 67 on the inner circumference. The engaged portions 67 protrude from the inner circumferential wall 66 in a direction toward the axis G. The plurality of engaged portions 67 are arranged at substantially regular intervals in the circumferential direction. The engaged portions 67 detachably engage the corresponding engaging portions 94 of the first sleeve 9. The plurality of ribs 69 protrude from the concave portion 62 to the other end side D2. The plurality of ribs 69 extend radially about the axis G and are arranged on the surface of the first flange 6 at the other end side D2 at substantially regular intervals. Between any pair of ribs 69 adjacent to each other among the plurality of ribs 69, a through hole 70 is formed to extend radially about the axis G and penetrate in the left-right direction.

As shown in FIGS. 4, 6 and 9A, 9B, the step portion 60 and the first contact portion 64 protrude from the first facing surface 61 to the one end side D1. The amount of protrusion of the step portion 60 from the first facing surface 61 in the axial direction D is greater than the amount of protrusion of the first contact portion 64 from the first facing surface 61. The step portion 60 is provided closer to the axis G than the first contact portion 64 is. As shown in FIG. 4, the first contact portion 64 contacts the right side surface of the paper tube C of the roll R arranged between the first flange 6 and the second flange 7. The first contact portion 64 includes a plurality of first protrusions 65 on its surface (that is, the left surface) at the one end side D1 such that the first protrusions 65 protrude to the one end side D1. As shown in FIG. 6, the plurality of first protrusions 65 are arranged radially about the axis G at substantially regular intervals in the circumferential direction. The amount of protrusion of the first protrusions 65 from the first contact portion 64 to the one end side D1 is smaller than the length of the first protrusions 65 in the radial direction. The amount of protrusion of the first protrusions 65 from the first contact portion 64 to the one end side D1 is smaller than the amount of protrusion of the first contact portion 64 from the first facing surface 61 to the one end side D1. As shown in FIG. 4, in a state where the roll R is supported by the medium supporting device 5, the inner circumference of the paper tube C of the roll R contacts the outer circumferential surface of the step portion 60. The first contact portion 64 contacts the right surface of the paper tube C. The first protrusions 65 are pressed into the right surface of the paper tube C.

As shown in FIGS. 3 to 9A, 9B, the second flange 7 protrudes from the shaft portion 8 in a direction crossing the axial direction D so as to define the position of the roll R in the axial direction D through which the shaft portion 8 is inserted. The second flange 7 is in the shape of a plate having a regular polygonal shape (regular hexadecagon) when viewed from the left side. The diameter of the second flange 7 is substantially equal to that of the first flange 6, and is greater than that of the roll R. The second flange 7 includes a second facing surface 71, a grip portion 72, a step portion 76, a second contact portion 74 and a recess 88. The second facing surface 71 is a surface at the other end side D2 (that is, the right surface) in the axial direction, and faces the roll R and the first flange 6. The second facing surface 71 extends substantially perpendicularly to the axis G.

As shown in FIG. 7, the grip portion 72 fits into a recess 73 and is fixed. The recess 73 is recessed from the outer circumference of the second flange 7 toward the axis G. As shown in FIGS. 5A and 5B, the step portion 76 and the second contact portion 74 protrude from the second facing surface 71 to the other end side D2. The amount of protrusion of the step portion 76 from the second facing surface 71 in the axial direction D is greater than the amount of protrusion of the second contact portion 74 from the second facing surface 71. The step portion 76 is provided closer to the axis G than the second contact portion 74 is. As shown in FIG. 4, the second contact portion 74 contacts the left side surface of the paper tube C of the roll R arranged between the first flange 6 and the second flange 7. The second contact portion 74 includes a plurality of second protrusions 75 on its surface at the other end side D2 (that is, the right surface) such that the second protrusions 75 protrude to the other end side D2. The plurality of second protrusions 75 are arranged radially about the axis G at substantially regular intervals in the circumferential direction. The amount of protrusion of the second protrusions 75 from the second contact portion 74 to the other end side D2 is smaller than the length of the second protrusions 75 in the radial direction. The amount of protrusion of the second protrusions 75 from the second contact portion 74 to the other end side D2 is smaller than the amount of protrusion of the second contact portion 74 from the second facing surface 71 to the other end side D2. As shown in FIG. 4, in the state where the roll R is supported by the medium supporting device 5, the inner circumference of the paper tube C of the roll R contacts the outer circumferential surface of the step portion 76. The second contact portion 74 contacts the left surface of the paper tube C. The plurality of second protrusions 75 are pressed into the left surface of the paper tube C. As shown in FIG. 6, the recess 88 is provided at the left side surface of the second flange 7 at the side of the axis G, and is recessed toward the other end side D2. The recess 88 is provided at a position corresponding to the step portion 76.

As shown in FIG. 7, the screw member 10 is rotatable about the axis G extending in the axial direction D, and is inserted through the hole of the shaft portion 8. The screw member 10 is rotatable relative to the shaft portion 8, the first flange 6 and the second flange 7 to change the relative position of the first flange 6 and the second flange 7 between a hold position and a separation position. The hold position is a position at which the paper tube C is pressed and pinched by the first contact portion 64 and the second contact portion 74 in the axial direction D. The separation position is a position at which at least one of the first contact portion 64 and the second contact portion 74 is separated from the paper tube C. The hold position changes according to the length of the roll R in the left-right direction arranged between the first flange 6 and the second flange 7. The distance in the axial direction D between the first flange 6 and the second flange 7 at the hold position is different from the distance in the axial direction D between the first flange 6 and the second flange 7 at the separation position. The distance in the axial direction D between the first flange 6 and the second flange 7 in the hold position is shorter than the distance in the axial direction D between the first flange 6 and the second flange 7 in the separation position.

The screw member 10 includes a shaft core portion 11, a body portion 12 and a pair of threads 13 and 14. The shaft core portion 11 has a cylindrical shape in which the axis G is the center axis. The body portion 12 is in the shape of a tube through which the shaft core portion 11 is inserted. The threads 13 and 14 are formed in the outer circumference of the body portion 12. The pair of threads 13 and 14 are located at different positions in the axial direction D. The pair of threads 13 and 14 of the present embodiment are perpendicular to the axial direction D and are symmetrical with respect to an imaginary plane V (see FIGS. 9A, 9B) which passes through the center portion of the screw member 10 in the axial direction D. In other words, the winding direction of the thread 13 is opposite the winding direction of the thread 14. The lead of the thread 13 and the lead of the thread 14 are equal to each other. The thread 13 is screwed to the first engaging protrusion 95 of the first sleeve 9. The thread 14 is screwed to the second engaging protrusion 80 of the second sleeve 77. As the screw member 10 is rotated, the first sleeve 9 and the second sleeve 77 are moved in the axial direction D. Thus, the first flange 6 which moves together with the first sleeve 9 and the second flange 7 which moves together with the second sleeve 77 move relative to the screw member 10 either in a direction in which the first flange 6 and the second flange 7 become close to each other or in a direction in which the first flange 6 and the second flange 7 are separated from each other. As shown in FIGS. 4 and 5, the end of the screw member 10 at the other end side D2, that is, the right end of the shaft core portion 11 is at the other end side D2 of the first flange 6.

The knob 45 is provided at the end of the screw member 10 at the other end side D2, that is, near the right end of the shaft core portion 11. The knob 45 is arranged at the other end side D2 of the first flange 6. The knob 45 has a cross shape in which the axis G is the center when viewed from the right side. The user hooks an operation member such as a finger on the knob 45 to rotate the knob 45 around the axis G, thereby rotating the screw member 10 around the axis G.

The stopper 20 extends in the axial direction D and is inserted from the one end side D1 of the second flange 7 through the holes 79 of the second protruding portions 78 of the second sleeve 77 so as to regulate the rotation of the first flange 6, the second flange 7 and the shaft portion 8 together with the screw member 10. As shown in FIGS. 6 and 7, the stopper 20 includes the pair of protruding portions 21, a disk portion 22, a tube portion 24 and the engaging portion 25. The pair of protruding portions 21 protrude from the disk portion 22 to the other end side D2 and are curved in a fan shape along an arc about the axis G when viewed from the right side. The pair of protruding portions 21 are provided symmetrically with respect to the point that is the axis G when viewed from the right side. The pair of protruding portions 21 are inserted respectively from the one end side D1 through the holes 79 of the pair of second protruding portions 78 of the second sleeve 77. The ends (right ends) of the pair of protruding portions 21 at the other end side D2 are located at the other end side D2 of the ends (right ends) of the pair of second protruding portions 78 at the other end side D2. The parts of the pair of protruding portions 21 which protrude farther rightward than the pair of second protruding portions 78 are arranged in the circumferential direction between the pair of first protruding portions 91. The disk portion 22 is provided at the left end of the stopper 20 and includes notches 23 in the outer circumferential surface. The disk portion 22 is arranged in the recess 88 corresponding to the step portion 76 of the second flange 7. The tube portion 24 is in the shape of a tube which penetrates the center portion of the disk portion 22 in the axial direction D. In the tube portion 24, a through hole 27 is formed to extend in the axial direction D. As shown in FIGS. 9A and 9B, the end of the shaft core portion 11 at the one end side D1 is inserted through the through hole 27, and thus the tube portion 24 supports the screw member 10 such that the screw member 10 is rotatable relative to the stopper 20.

As shown in FIGS. 6 and 9A, 9B, the engaging portion 25 is arranged at the one end side D1 of the second flange 7, and detachably engages with the engaged portion 108 which transmits the drive force of the drive part 101 of the printing apparatus 1. The engaging portion 25 includes a tube portion 26 and a plurality of protruding portions 28. The tube portion 26 protrudes leftward from the left surface of the second flange 7. The tube portion 26 is connected to the tube portion 24. The protruding portions 28 protrudes radially from the outer circumferential surface of the tube portion 26. The protruding portions 28 are arranged in the circumferential direction at substantially regular intervals. When the engaging portion 25 engages with the engaged portion 108 of the drive mechanism 110, the shaft portion 105 is inserted from the left side through the through hole 27 of the tube portion 26, and thus the protruding portions 107 and the protruding portions 28 engage with each other. As shown in FIGS. 3 and 4, in a state where the engaging portion 25 engages with the engaged portion 108 and where the end of the screw member 10 at the other end side D2 is supported, the medium supporting device 5 is detachably accommodated in the accommodating portion 3 of the printing apparatus 1. The first flange 6, the second flange 7, the shaft portion 8 and the stopper 20 are rotatable about the axis G relative to the screw member 10 by driving of the drive part 101.

As shown in FIG. 2, the fixing unit 40 is arranged downstream of the print head 46 in the conveyance direction and upstream of the third conveyor 50 in the conveyance direction. The fixing unit 40 is a halogen heater and includes a halogen lamp 41, a reflective plate 42 and a housing 43. In the lower wall of the housing 43, an opening 44 is formed along the left-right direction. The fixing unit 40 radiates infrared light through the opening 44 to heat the print medium M passing directly below the opening 44. In this way, the liquid H ejected by the print head 46 on the print medium M is fixed to the print medium M.

The second conveyor 49 is provided below the print head 46 and downstream of the first conveyor 47 in the conveyance direction, and conveys the print medium M in the conveyance direction B. The second conveyor 49 includes a drive roller 491, a follow roller 492 and an endless belt 493. The drive roller 491 and the follow roller 492 are separate from each other in the front-rear direction. The endless belt 493 is stretched over the drive roller 491 and the follow roller 492. The drive roller 491 is rotated by a drive force from a second conveyance drive part to rotate the endless belt 493. As the endless belt 493 is rotated, the follow roller 492 is rotated. The upper end of the outer circumferential surface of the endless belt 493 is substantially the same as the vertical position of the part of the print medium M nipped by the first conveyor 47, and faces the nozzles of the print head 46. The upper end of the outer circumferential surface of the endless belt 493 supports, from below, the print medium M conveyed in the conveyance direction B between the first conveyor 47 and the third conveyor 50 and conveys the print medium M. The second conveyance drive part is, for example, a stepping motor.

The third conveyor 50 is provided downstream of the print head 46 and the fixing unit 40 in the conveyance direction and upstream of the discharge port 31 in the conveyance direction, and conveys the print medium M in the conveyance direction B and in the return direction E. The third conveyor 50 includes a conveyance roller 501 which is rotatable about an axis extending in the left-right direction and a pinch roller 502, and the conveyance roller 501 and the pinch roller 502 pinch the print medium M vertically and perform nip conveyance. The third conveyance drive part is, for example, a stepping motor which is rotatable forward and backward.

When print processing is performed in the printing apparatus 1, a controller of the printing apparatus 1 drives the first conveyor 47, the second conveyor 49, the third conveyor 50 and the medium supporting device 5 so as to convey the print medium M. The controller of the printing apparatus 1 drives the print head 46 in synchronization with the conveyance of the print medium M to eject the liquid H to the print medium M. The controller of the printing apparatus 1 drives the halogen lamp 41 to fix, on the print medium M, the liquid H on the print medium M. The print medium M is discharged from the discharge port 31 to the outside of the housing 2.

The operation of replacing the roll R will be described. When the roll R arranged within the housing 2 is replaced, the user moves the cover 33 of the housing 2 to the open position and removes the magazine 4 supporting the medium supporting device 5 to the outside of the housing 2. Here, as shown in FIGS. 5A and 6, the engagement of the engaging portion 25 of the medium supporting device 5 and the engaged portion 108 of the magazine 4 is disengaged. The user detaches the medium supporting device 5 from the magazine 4. For example, the user hooks a finger on the concave portion 62 of the first flange 6 of the medium supporting device 5 and grips the grip portion 72 of the second flange 7, and thereby carries the medium supporting device 5 with both hands. Since each of the first flange 6 and the second flange 7 is in the shape of a plate having a regular polygonal shape when viewed from the side, even if the medium supporting device 5 is placed on a flat surface of a workbench or the like in a posture in which the axis G of the medium supporting device 5 extends in the horizontal direction, the medium supporting device 5 is prevented from rotating about the axis G. The user stably performs the operation in a state where the medium supporting device 5 is placed on the workbench in the posture in which the axis G of the medium supporting device 5 extends in the horizontal direction. The user rotates the first flange 6 clockwise relative to the first sleeve 9 when viewed from the left side to disengage the engagement of the engaging portions 94 of the first sleeve 9 and the engaged portions 67 of the first flange 6, and thereby moves the first flange 6 rightward relative to the first sleeve 9. In this way, the first flange 6 is detached from the medium supporting device 5, and thus the paper tube C through which the shaft portion 8 is inserted becomes a detachable state. The user moves the paper tube C rightward relative to the shaft portion 8 and removes the paper tube C from the medium supporting device 5.

The user moves the paper tube C of a new roll R leftward relative to the shaft portion 8 to insert the shaft portion 8 through the paper tube C. The inner circumferential surface of the left end of the paper tube C contacts the outer circumferential surface of the step portion 76 of the second flange 7. The left end of the paper tube C contacts the right surface of the second contact portion 74 of the second flange 7. The user moves the first flange 6 leftward relative to the shaft portion 8 to cause the inner circumferential wall 66 of the first flange 6 to contact the flange portion 92 of the cylindrical portion 90 of the first sleeve 9 from the right side. The user rotates the first flange 6 counterclockwise relative to the first sleeve 9 when viewed from the left side to engage the engaging portions 94 of the first sleeve 9 with the engaged portions 67 of the first flange 6. The user operates the knob 45 to rotate the screw member 10 relative to the first flange 6, the second flange 7, the shaft portion 8 and the stopper 20, and thereby changes the distance in the axial direction D between the first flange 6 and the second flange 7.

When the knob 45 is rotated clockwise when viewed from the right side from the position shown in FIGS. 8A and 9A, as shown in FIGS. 8B and 9B, the distance in the axial direction D between the first flange 6 and the second flange 7 is narrowed as compared with the distance before the rotation of the knob 45. When the knob 45 is rotated counterclockwise when viewed from the right side from the position shown in FIGS. 8B and 9B, as shown in FIGS. 8A and 9A, the distance in the axial direction D between the first flange 6 and the second flange 7 is widened as compared with the distance before the rotation of the knob 45. Due to the rotation of the knob 45, the screw member 10 changes the relative position of the first flange 6 and the second flange 7 between the hold position and the separation position. As shown in FIG. 4, when the first flange 6 and the second flange 7 are moved to the hold position, the first contact portion 64 and the second contact portion 74 press and pinch the paper tube C in the axial direction D. The plurality of first protrusions 65 are pressed into the right side surface of the paper tube C, and the plurality of second protrusions 75 are pressed into the left side surface of the paper tube C. The first facing surface 61 of the first flange 6 and the second facing surface 71 of the second flange 7 are separated from the roll R in the axial direction D. The user places the right end of the medium supporting device 5 to be supported by the magazine 4. The right end of the screw member 10, that is, the right end of the shaft core portion 11 is supported by the support portion 211. The user places the magazine 4 supporting the medium supporting device 5 to be arranged at a particular position within the housing 2 through the opening 32 of the housing 2. As shown in FIGS. 3 and 4, the engaging portion 25 engages with the engaged portion 108, and the medium supporting device 5 is supported by the magazine 4 and the drive mechanism 110.

In the above-described embodiment, the printing apparatus 1, the medium supporting device 5, the first flange 6, the second flange 7, the shaft portion 8, the screw member 10, the first contact portion 64, the first protrusion 65, the second contact portion 74, and the second protrusion 75 are examples of a printing apparatus, a medium supporting device, a first flange, a second flange, a shaft portion, a screw member, a first contact portion, a first protrusion, a second contact portion, and a second protrusion of this disclosure, respectively. The first sleeve 9, the screw member 10, the stopper 20, the engaging portion 25, the first facing surface 61, the concave portion 62, the second facing surface 71, the grip portion 72, the second sleeve 77, the second protruding portion 78, the second engaging protrusion 80, the first protruding portion 91, and the first engaging protrusion 95 are examples of a first sleeve, a screw member, a stopper, an engaging portion, a first facing surface, a concave portion, a second facing surface, a grip, a second sleeve, a second protruding portion, a second engaging protrusion, a first protruding portion, and a first engaging protrusion of this disclosure, respectively. The threads 13, 14 are examples of a pair of threads (first thread and second thread) of this disclosure. The accommodating portion 3 is an example of an accommodating portion of this disclosure.

The medium supporting device 5 of the printing apparatus 1 of the embodiment described above includes the shaft portion 8, the first flange 6, the second flange 7 and the screw member 10. The shaft portion 8 is inserted through the paper tube C of the roll R around which the elongated print medium M is wound, and the shaft portion 8 extends in the axial direction D. The first flange 6 protrudes from the shaft portion 8 in the direction crossing the axial direction D so as to define the position of the roll R in the axial direction D through which the shaft portion 8 is inserted. The first flange 6 includes the first facing surface 61 and the first contact portion 64. The first facing surface 61 is the surface at the one end side D1 and faces the roll R. The first contact portion 64 protrudes from the first facing surface 61 toward the one end side D1 to contact the paper tube C. The second flange 7 protrudes from the shaft portion 8 in the direction crossing the axial direction D so as to define the position of the roll R in the axial direction D through which the shaft portion 8 is inserted. The second flange 7 includes the second facing surface 71 and the second contact portion 74. The second facing surface 71 is the surface at the other end side D2 and faces the roll R. The second contact portion 74 protrudes from the second facing surface 71 toward the other end side D2 to contact the paper tube C. The screw member 10 is rotatable about the axis G extending in the axial direction D, and is inserted through the shaft portion 8. The screw member 10 is rotatable relative to the shaft portion 8, the first flange 6 and the second flange 7, and thus the relative position of the first flange 6 and the second flange 7 is changed between the hold position and the separation position. The hold position is a position at which the paper tube C is pressed and pinched by the first contact portion 64 and the second contact portion 74 in the axial direction D. The separation position is a position at which at least one of the first contact portion 64 and the second contact portion 74 is separated from the paper tube C. Since the medium supporting device 5 presses and pinches both ends of the paper tube C with the first contact portion 64 and the second contact portion 74, even when there is a variation in the diameter of the paper tube C, the paper tube C is stably fixed as compared with the conventional method.

The first contact portion 64 includes, on the surface at the one end side D1, the plurality of first protrusions 65 which protrude to the one end side D1. The second contact portion 74 includes, on the surface at the other end side D2, the plurality of second protrusions 75 which protrude to the other end side D2. Since the first protrusions 65 and the second protrusions 75 are pressed into the side surfaces of the paper tube C in the axial direction D, the medium supporting device 5 securely fixes the paper tube C as compared with a case where the first protrusions 65 and the second protrusions 75 are not provided.

The shaft portion 8 includes the first sleeve 9 and the second sleeve 77. The first sleeve 9 includes the first protruding portions 91 which protrude from the first contact portion 64 to the one end side D1, and is movable together with the first flange 6 in the axial direction D relative to the screw member 10. The second sleeve 77 includes the second protruding portions 78 which protrude farther toward the other end side D2 than the second contact portion 74, and is movable together with the second flange 7 in the axial direction D relative to the screw member 10. The first sleeve 9 engages with the second sleeve 77 so as to be movable in the axial direction D relative to the second sleeve 77. Hence, the medium supporting device 5 changes the relative position of the first sleeve 9 and the second sleeve 77 of the shaft portion 8 in the axial direction D to change the relative position of the first flange 6 and the second flange 7 in the axial direction D. The medium supporting device 5 relatively simply achieves the configuration for moving the first flange 6 and the second flange 7 in the axial direction D.

The first flange 6 is detachably fitted into the first sleeve 9. In the medium supporting device 5, the user performs a simple operation of detaching the first flange 6 from the first sleeve 9 to perform the operation of replacing the roll R.

The screw member 10 includes the pair of threads 13 and 14 which are located at different positions in the axial direction D. The first sleeve 9 includes the first engaging protrusion 95 which engages with the thread 13. The second sleeve 77 includes the second engaging protrusion 80 which engages with the thread 14. The first flange 6 and the second flange 7 are moved relative to the screw member 10 due to the rotation of the screw member 10 either in the direction in which the first flange 6 and the second flange 7 become close to each other or in the direction in which the first flange 6 and the second flange 7 are separated from each other. In the medium supporting device 5, by rotating the screw member 10, both the first flange 6 and the second flange 7 are moved in the axial direction D relative to the screw member 10. In the medium supporting device 5, regardless of the length of the roll R in the axial direction D, the center position of the roll R in the axial direction D is set substantially constant.

The pair of threads 13 and 14 are symmetrical with respect to the imaginary plane V which is perpendicular to the axial direction D and passes through the center of the screw member 10 in the axial direction D. By this symmetrical shape, as compared with a case where the symmetrical shape is not provided, the printing apparatus 1 easily manages a phase shift in the circumferential direction of the screw member 10. The first engaging protrusion 95 is a first female screw portion which is screwed to the thread 13. The second engaging protrusion 80 is a second female screw portion which is screwed to the thread 14. As compared with a case where the first engaging protrusion 95 and the second engaging protrusion 80 are not the female screw portions, by rotating the screw member 10 about the axis G, the first flange 6 and the second flange 7 are smoothly moved relative to the screw member 10. In the medium supporting device 5, since the first flange 6 and the second flange 7 are moved in the directions opposite each other by the same distance as the screw member 10 is rotated, the center of the roll R in the width direction (the left-right direction) pinched between the first flange 6 and the second flange 7 is set constant regardless of the length of the roll R in the width direction.

The medium supporting device 5 includes the stopper 20 which extends in the axial direction D, which is inserted through the second protruding portions 78 of the second sleeve 77 from the one end side D1 of the second flange 7 and which regulates the rotation of the first flange 6, the second flange 7 and the shaft portion 8 relative to the screw member 10. The medium supporting device 5 has a relatively simple configuration to regulate the rotation of the first flange 6, the second flange 7 and the shaft portion 8 relative to the screw member 10.

The end of the screw member 10 at the other end side D2 is located at the other end side D2 of the first flange 6. The medium supporting device 5 includes the knob 45 on the screw member 10 at the other end side D2 of the first flange 6. In the medium supporting device 5, as compared with a case where the knob 45 is not provided, the user easily performs the operation of rotating the screw member 10. The first engaging protrusion 95 and the second engaging protrusion 80 of the present embodiment are provided by several leads on a part in the circumferential direction. Hence, as compared with a case where the first engaging protrusion 95 and the second engaging protrusion 80 are provided over the entire circumference in the circumferential direction, a small amount of friction is generated between the screw member 10 and the first engaging protrusion 95 and the second engaging protrusion 80, and thus the knob 45 is rotatable with a small amount of force.

The second flange 7 includes the grip portion 72. At the opposite side of the first facing surface 61 of the first flange 6, the concave portion 62 is formed to be recessed toward the one end side D1. In the medium supporting device 5, the user holds the grip portion 72 of the second flange 7 and the outer circumferential surface of the first flange 6 so as to easily carry the medium supporting device 5.

The stopper 20 detachably engages with the engaged portion 108, which transmits the power of the drive part 101 of the printing apparatus 1, from the one end side D1 of the second flange 7. The end of the screw member 10 at the other end side D2 extends to the other end side D2 of the first flange 6. In a state where the engaging portion 25 engages with the engaged portion 108 and where the end of the screw member 10 at the other end side D2 is supported, the medium supporting device 5 is detachably accommodated in the accommodating portion 3 of the printing apparatus 1 so as to be removed from the accommodating portion 3, and the first flange 6, the second flange 7, the shaft portion 8 and the stopper 20 rotate about the axis G due to the driving of the drive part 101. The medium supporting device 5 has a relatively simple configuration to accommodate the medium supporting device 5 in the accommodating portion 3 of the printing apparatus 1. The medium supporting device 5 simply achieves the configuration for transmitting the power of the drive part 101 from the printing apparatus 1 to the first flange 6, the second flange 7 and the shaft portion 8.

The printing apparatus 1 includes the medium supporting device 5, the drive part 101 and the accommodating portion 3. The drive part 101 transmits the power to the engaged portion 108 which detachably engages with the engaging portion 25 of the medium supporting device 5, and rotates the first flange 6, the second flange 7, the shaft portion 8 and the stopper 20 of the medium supporting device 5 relative to the screw member 10. The accommodating portion 3 accommodates the medium supporting device 5 in which the end (right end) of the screw member 10 at the other end side D2 is supported. In the printing apparatus 1, the medium supporting device 5 presses and pinches both ends of the paper tube C with the first contact portion 64 and the second contact portion 74. Hence, even when there is a variation in the diameter of the paper tube C, the medium supporting device 5 stably fixes the paper tube C as compared with a conventional method, and thus the print medium M is stably conveyed as compared with a case where a conventional medium supporting device is provided.

While the disclosure has been described in detail with reference to the above aspects thereof, it would be apparent to those skilled in the art that various changes and modifications may be made therein without departing from the scope of the claims. For example, the following modifications may be made.

The configuration of the printing apparatus 1 may be changed as appropriate. The accommodating portion 3 may accommodate the medium supporting device 5 for a long medium, and the arrangement, size, and so on in the printing apparatus 1 may be appropriately changed. The configuration of the print head 46 may be appropriately changed, and may be an inkjet head capable of color printing, or an electrophotographic print engine or a thermal head. The fixing unit 40 may be omitted or the configuration may be changed depending on the printing method of the printing apparatus 1. The printing apparatus 1 may include a cutter configured to cut a print medium M along the width direction after printing. At least one of the first conveyor 47, the second conveyor 49, and the third conveyor 50 may be omitted as appropriate, or the configuration may be changed. The drive part 101 may be an actuator other than a stepping motor, such as a DC motor. The printing apparatus 1 may not include the magazine 4 to which the medium supporting device 5 is detachably attached. The configuration of the magazine 4 may be changed as appropriate, and the right end of the screw member 10 may be supported by a bearing. The magazine 4 may be U-shaped in rear view, and may support both ends of the medium supporting device 5 in the axial direction D.

The configuration of the medium supporting device 5 may be changed as appropriate. In the first contact portion 64, the plurality of first protrusions 65 may be omitted. The number, shape and arrangement of the plurality of first protrusions 65 may be changed as appropriate. Similarly, in the second contact portion 74, the plurality of second protrusions 75 may be omitted. The number, shape and arrangement of the plurality of second protrusions 75 may be changed as appropriate. The shape of the side surfaces of the first flange 6 and the second flange 7 may be appropriately changed to shapes such as a circular shape and an elliptical shape. The first flange 6 may not have the concave portion 62, and may have a configuration similar to the grip portion 72 instead of the concave portion 62. The second flange 7 may not include the grip portion 72, and may have a configuration similar to the concave portion 62. The shape of the concave portion 62 may be changed as appropriate. The first flange 6 may not have the step portion 60 and may contact the roll R. The second flange 7 may not have the step portion 76 and may contact the roll R.

The first flange 6 and the first sleeve 9 may be formed integrally. In that case, the user may remove the first flange 6 and the first sleeve 9 from the medium supporting device 5 to perform replacement work of the roll R. The second flange 7 and the second sleeve 77 may be formed separately. At least one of the first engaging protrusion 95 and the second engaging protrusion 80 may have a shape for engaging the thread, and may not be a female screw. The extending ranges of the first engaging protrusion 95 and the second engaging protrusion 80 in the axial direction D and in the circumferential direction may be changed as appropriate. The numbers of the first protruding portion 91, the second protruding portion 78, and the protruding portion 21 may be one or more, and may be the same number or different from each other. The extending ranges of the first protruding portion 91, the second protruding portion 78, and the protruding portion 21 in the circumferential direction may be changed as appropriate. The medium supporting device 5 may not include the stopper 20 and the engaging portion 25, and may not be driven to rotate about the axis G by the driving of the drive part 101 of the printing apparatus 1.

Each of the pair of threads 13 and 14 of the screw member 10 of the medium supporting device 5 may have other structures including spiral grooves and peaks (concavities and convexities). The pair of threads 13 and 14 of the screw member 10 of the medium supporting device 5 may not be symmetrical with respect to the imaginary plane V. For example, the pair of threads 13 and 14 may have the same lead advancing amount (lead angle) in opposite directions between the thread 13 and the thread 14. The pitch of the grooves and peaks of the threads 13 and 14 of the screw member 10 may be wider than the pitch of the grooves and peaks of the threads 13 and 14 of the screw member 10 in the above embodiment. For example, the screw member 10 may be designed such that the lead of the thread 13 and the lead of the thread 14 are different from each other, and the first flange 6 and the second flange 7 may be moved in opposite directions by different distances from each other in response to the rotation of the screw member 10. In the medium supporting device 5, only one of the first flange 6 and the second flange 7 may be moved relative to the screw member 10.

Figure 10A:
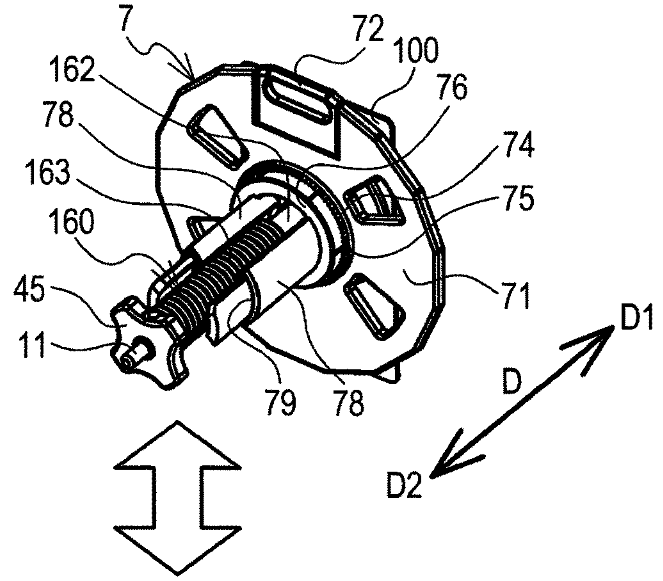
FIG. 10A is a perspective view of a medium supporting device 150 in a state where the first flange 6 and a first sleeve 9 are detached from the medium supporting device 150.
Figure 10B:
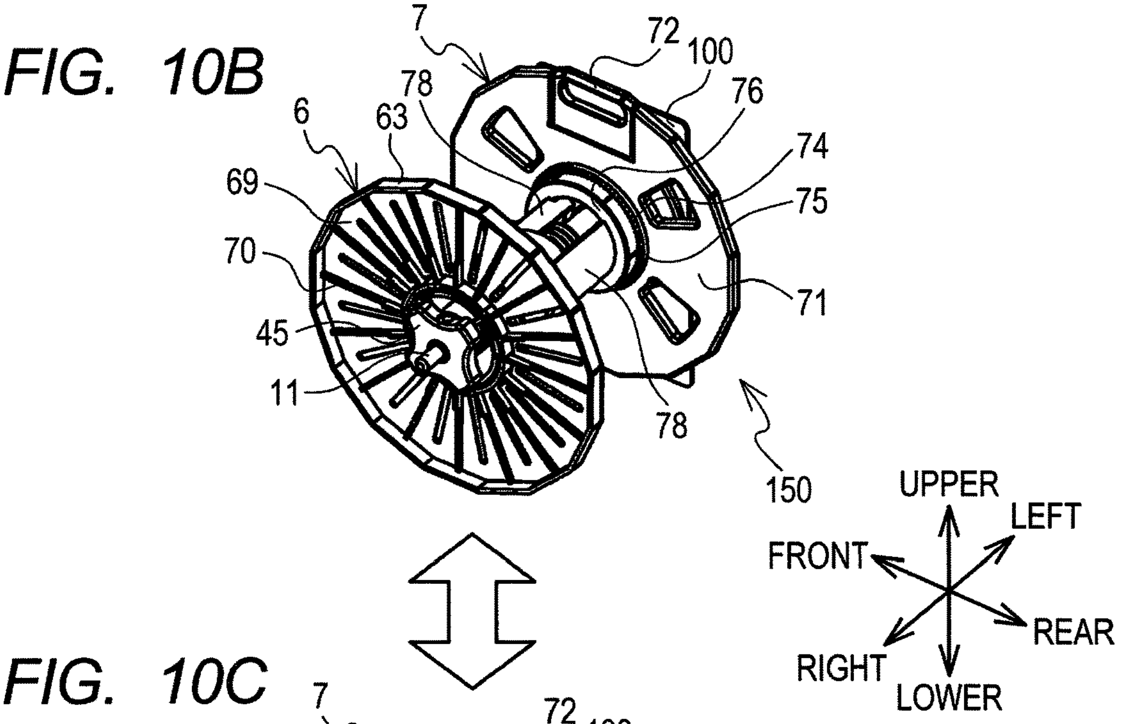
FIG. 10B is a perspective view of the medium supporting device 150 in a state where the distance between the first flange 6 and the second flange 7 in the axial direction D is the greatest.
Figure 10C:
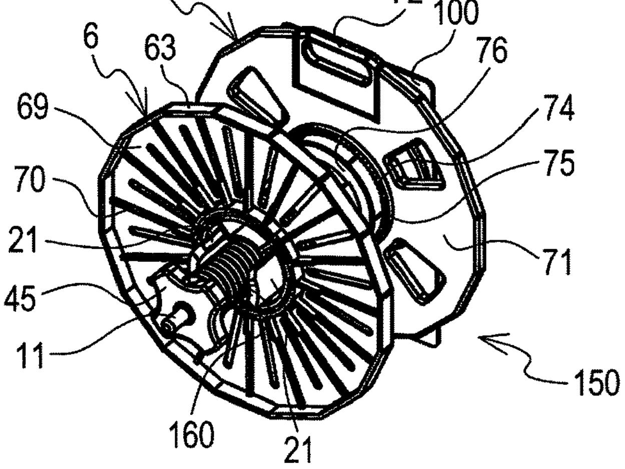
FIG. 10C is a perspective view of the medium supporting device 150 in a state where the distance between the first flange 6 and the second flange 7 in the axial direction D is the shortest.

As shown in FIGS. 10A to 10C, a medium supporting device 150 according to a modification may include a screw member 160 in place of the screw member 10 of the medium supporting device 5. In FIGS. 10A to 10C, the same reference numerals are given to the same members as those of the medium supporting device 5. The medium supporting device 150 does not include the second engaging protrusion 80. As shown in FIG. 10A, the screw member 160 includes a shaft core portion 11, a body portion 162, and a thread 163. The thread 163 is formed on the outer circumference of the body portion 162. The thread 163 engages with the first engaging protrusion 95 of the first flange 6. As shown in FIG. 10B, when the screw member 160 is inserted through the first sleeve 9 and the first flange 6 and the knob 45 is rotated clockwise in the right view, only the first flange 6 moves toward the one end side D1 in the axial direction relative to the screw member 160, and as shown in FIG. 10C, the distance between the first flange 6 and the second flange 7 in the axial direction D becomes shorter than before the rotation. When the knob 45 is rotated counterclockwise in the right side view from the state shown in FIG. 10C, as shown in FIG. 10B, only the first flange 6 moves toward the other end side D2 in the axial direction relative to the screw member 160, and the distance between the first flange 6 and the second flange 7 in the axial direction D becomes greater than before the rotation. In the medium supporting device 150 of the modification, the position of the left end of the roll R is fixed regardless of the length of the width direction of the roll R.

The medium supporting device and the printing apparatus of another modification may be configured by appropriately combining the features of the medium supporting device and the printing apparatus disclosed in the above embodiment and the above modification.

What is claimed is:

1. A medium supporting device comprising:

a shaft portion extending in an axial direction, the shaft portion being inserted in a paper tube of a roll, a print medium being wound around the paper tube;

a first flange protruding from the shaft portion in a direction crossing the axial direction, the first flange defining a position of the roll fitted to the shaft portion in the axial direction, the first flange including a first facing surface and a first contact portion, the first facing surface facing the roll and facing toward one end side in the axial direction, the first contact portion protruding from the first facing surface toward the one end side in the axial direction, the first contact portion being configured to contact the paper tube;

a second flange protruding from the shaft portion in the direction crossing the axial direction, the second flange defining, in cooperation with the first flange, the position of the roll fitted to the shaft portion in the axial direction, the second flange including a second facing surface and a second contact portion, the second facing surface facing the roll and facing toward an other end side in the axial direction, the second contact portion protruding from the second facing surface toward the other end side in the axial direction, the second contact portion being configured to contact the paper tube; and a screw member rotatable about an axis extending in the axial direction, the screw member being inserted in the shaft portion, the screw member being rotatable relative to the shaft portion, the first flange, and the second flange, thereby changing a relative position of the first flange and the second flange between a hold position at which the first contact portion and the second contact portion press and hold the paper tube in the axial direction and a separation position at which at least the first contact portion or the second contact portion is separated from the paper tube.

2. The medium supporting device according to claim 1, wherein the first contact portion includes a plurality of first protrusions protruding toward the one end side in the axial direction, the plurality of first protrusions being provided at a surface of the first contact portion facing toward the one end side in the axial direction; and wherein the second contact portion includes a plurality of second protrusions protruding toward the other end side in the axial direction, the plurality of second protrusions being provided at a surface of the second contact portion facing toward the other end side in the axial direction.

3. The medium supporting device according to claim 1, wherein the shaft portion includes:

a first sleeve including a first protruding portion protruding farther toward the one end side in the axial direction than the first contact portion is, the first sleeve being movable, together with the first flange, in the axial direction relative to the screw member; and a second sleeve including a second protruding portion protruding farther toward the other end side in the axial direction than the second contact portion is, the second sleeve being movable, together with the second flange, in the axial direction relative to the screw member; and wherein the first sleeve engages with the second sleeve so as to be movable in the axial direction relative to the second sleeve.

4. The medium supporting device according to claim 3, wherein the first flange is detachably fitted to the first sleeve.

5. The medium supporting device according to claim 3, wherein the screw member has a first thread and a second thread located at different positions from each other in the axial direction;

wherein the first sleeve includes a first engaging protrusion engaging with the first thread;

wherein the second sleeve includes a second engaging protrusion engaging with the second thread; and wherein the first flange and the second flange are configured to move, relative to the screw member, in directions in which the first flange and the second flange become closer to each other and in directions in which the first flange and the second flange are separated from each other, depending on a rotational direction of the screw member.

6. The medium supporting device according to claim 5, wherein the first thread and the second thread are symmetrical with respect to an imaginary plane, the imaginary plane being perpendicular to the axial direction and passing through a center of the screw member in the axial direction;

wherein the first engaging protrusion is a first female screw portion engaging with the first thread; and wherein the second engaging protrusion is a second female screw portion engaging with the second thread.

7. The medium supporting device according to claim 5, further comprising a stopper extending in the axial direction, the stopper being inserted into the second protruding portion of the second sleeve from the one end side of the second flange in the axial direction, the stopper being configured to prevent the first flange, the second flange, and the shaft portion from rotating together with the screw member.

8. The medium supporting device according to claim 7, wherein the stopper includes an engaging portion configured to detachably engage an engaged portion that transmits power of a motor of a printing apparatus, the engaging portion being located at the one end side of the second flange in the axial direction;

wherein an end of the screw member at the other end side in the axial direction extends to the other end side of the first flange in the axial direction; and wherein the medium supporting device is accommodated in an accommodating portion of the printing apparatus in a state wherein the engaging portion engages with the engaged portion and the end of the screw member at the other end side in the axial direction is supported; and wherein the first flange, the second flange, the shaft portion, and the stopper are configured to rotate about the axis by driving of the motor.

9. The medium supporting device according to claim 1, wherein an end of the screw member at the other end side in the axial direction is located at the other end side of the first flange in the axial direction; and wherein the medium supporting device further comprises a knob located at the screw member and located at the other end side of the first flange in the axial direction.

10. The medium supporting device according to claim 1, wherein the second flange includes a grip; and wherein an opposite surface of the first flange has a concave portion that is recessed toward the one end side in the axial direction, the opposite surface facing toward the other end side in the axial direction.

11. A printing apparatus comprising:

a housing having an accommodating portion; and a medium supporting device accommodated in the accommodating portion, the medium supporting device comprising:

a shaft portion extending in an axial direction, the shaft portion being inserted in a paper tube of a roll, a print medium being wound around the paper tube;

a first flange protruding from the shaft portion in a direction crossing the axial direction, the first flange defining a position of the roll fitted to the shaft portion in the axial direction, the first flange including a first facing surface and a first contact portion, the first facing surface facing the roll and facing toward one end side in the axial direction, the first contact portion protruding from the first facing surface toward the one end side in the axial direction, the first contact portion being configured to contact the paper tube;

a second flange protruding from the shaft portion in the direction crossing the axial direction, the second flange defining, in cooperation with the first flange, the position of the roll fitted to the shaft portion in the axial direction, the second flange including a second facing surface and a second contact portion, the second facing surface facing the roll and facing toward an other end side in the axial direction, the second contact portion protruding from the second facing surface toward the other end side in the axial direction, the second contact portion being configured to contact the paper tube; and a screw member rotatable about an axis extending in the axial direction, the screw member being inserted in the shaft portion, the screw member being rotatable relative to the shaft portion, the first flange, and the second flange, thereby changing a relative position of the first flange and the second flange between a hold position at which the first contact portion and the second contact portion press and hold the paper tube in the axial direction and a separation position at which at least the first contact portion or the second contact portion is separated from the paper tube.

12. The printing apparatus according to claim 11, wherein the first contact portion includes a plurality of first protrusions protruding toward the one end side in the axial direction, the plurality of first protrusions being provided at a surface of the first contact portion facing toward the one end side in the axial direction; and wherein the second contact portion includes a plurality of second protrusions protruding toward the other end side in the axial direction, the plurality of second protrusions being provided at a surface of the second contact portion facing toward the other end side in the axial direction.

13. The printing apparatus according to claim 11, wherein the shaft portion includes:

a first sleeve including a first protruding portion protruding farther toward the one end side in the axial direction than the first contact portion is, the first sleeve being movable, together with the first flange, in the axial direction relative to the screw member; and a second sleeve including a second protruding portion protruding farther toward the other end side in the axial direction than the second contact portion is, the second sleeve being movable, together with the second flange, in the axial direction relative to the screw member; and wherein the first sleeve engages with the second sleeve so as to be movable in the axial direction relative to the second sleeve.

14. The printing apparatus according to claim 13, wherein the first flange is detachably fitted to the first sleeve.

15. The printing apparatus according to claim 13, wherein the screw member has a first thread and a second thread located at different positions from each other in the axial direction;

wherein the first sleeve includes a first engaging protrusion engaging with the first thread;

wherein the second sleeve includes a second engaging protrusion engaging with the second thread; and wherein the first flange and the second flange are configured to move, relative to the screw member, in directions in which the first flange and the second flange become closer to each other and in directions in which the first flange and the second flange are separated from each other, depending on a rotational direction of the screw member.

16. The printing apparatus according to claim 15, wherein the first thread and the second thread are symmetrical with respect to an imaginary plane, the imaginary plane being perpendicular to the axial direction and passing through a center of the screw member in the axial direction;

wherein the first engaging protrusion is a first female screw portion engaging with the first thread; and wherein the second engaging protrusion is a second female screw portion engaging with the second thread.

17. The printing apparatus according to claim 15, wherein the medium supporting device further comprises a stopper extending in the axial direction, the stopper being inserted into the second protruding portion of the second sleeve from the one end side of the second flange in the axial direction, the stopper being configured to prevent the first flange, the second flange, and the shaft portion from rotating together with the screw member.

18. The printing apparatus according to claim 17, further comprising a motor, wherein the stopper includes an engaging portion configured to detachably engage an engaged portion that transmits power of the motor, the engaging portion being located at the one end side of the second flange in the axial direction;

wherein an end of the screw member at the other end side in the axial direction extends to the other end side of the first flange in the axial direction;

wherein the medium supporting device is accommodated in the accommodating portion in a state wherein the engaging portion engages with the engaged portion and the end of the screw member at the other end side in the axial direction is supported; and wherein the first flange, the second flange, the shaft portion, and the stopper are configured to rotate about the axis by driving of the motor.

19. The printing apparatus according to claim 11, wherein an end of the screw member at the other end side in the axial direction is located at the other end side of the first flange in the axial direction; and wherein the medium supporting device further comprises a knob located at the screw member and located at the other end side of the first flange in the axial direction.

20. The printing apparatus according to claim 11, wherein the second flange includes a grip; and wherein an opposite surface of the first flange has a concave portion that is recessed toward the one end side in the axial direction, the opposite surface facing toward the other end side in the axial direction.

* * * * *